United States Patent
Nepomuceno et al.

(10) Patent No.: US 11,257,377 B1
(45) Date of Patent: *Feb. 22, 2022

(54) SYSTEM FOR IDENTIFYING HIGH RISK PARKING LOTS

(71) Applicant: STATE FARM MUTUAL AUTOMOBILE INSURANCE COMPANY, Bloomington, IL (US)

(72) Inventors: John A. Nepomuceno, Bloomington, IL (US); Leo Chan, Normal, IL (US); Steven C. Cielocha, Bloomington, IL (US); Roxane Lyons, Chenoa, IL (US); Matthew S. Megyese, Bloomington, IL (US); William J. Leise, Normal, IL (US); Jennifer L. Crawford, Normal, IL (US); Jennifer Criswell Kellett, Lincoln, IL (US); Kristopher Keith Gaudin, Bloomington, IL (US); Jeremy Myers, Normal, IL (US); Edward P. Matesevac, III, Normal, IL (US); Rajiv C. Shah, Bloomington, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/944,893

(22) Filed: Jul. 31, 2020

Related U.S. Application Data

(63) Continuation of application No. 16/513,874, filed on Jul. 17, 2019, now Pat. No. 10,930,158, which is a
(Continued)

(51) Int. Cl.
*G08G 1/00* (2006.01)
*G01C 21/34* (2006.01)
(Continued)

(52) U.S. Cl.
CPC ......... *G08G 1/205* (2013.01); *G01C 21/3461* (2013.01); *G01C 21/3685* (2013.01);
(Continued)

(58) Field of Classification Search
CPC ...................................... G08G 1/205
See application file for complete search history.

(56) References Cited

U.S. PATENT DOCUMENTS

| 4,864,298 A | 9/1989 | Dombrowski |
| 5,828,299 A | 10/1998 | Chen |

(Continued)

FOREIGN PATENT DOCUMENTS

WO    WO-03/093857 A2    11/2003

OTHER PUBLICATIONS

Worley, Road Traffic Accidents Increase Dramatically Worldwide, Popular Reference Bureau, Mar. 1, 2006.
(Continued)

*Primary Examiner* — Travis R Hunnings
(74) *Attorney, Agent, or Firm* — Marshall, Gerstein & Borunllp

(57) ABSTRACT

Systems and methods are disclosed for identifying high risk parking lots. High risk parking lots may be, for example, parking lots that pose a higher than average risk of collisions and/or theft. Auto insurance claim data may be analyzed to identify hazardous areas. A virtual navigation of roads within the hazardous area may be identified. Public parking lots within the virtual navigation map may be defined, with each public parking lot determined as either in a hazardous area or not. A vehicle may be determined to be approaching or parking in a parking lot in a hazardous area, and a nearby public parking lot not associated with the hazardous area may be selected instead. A route from a current position to the nearby public parking lot may be generated, and the
(Continued)

vehicle may be routed to the nearby public parking lot. As a result, collisions and thefts may be reduced.

20 Claims, 8 Drawing Sheets

Related U.S. Application Data continuation of application No. 16/223,578, filed on Dec. 18, 2018, now Pat. No. 10,403,150, which is a continuation of application No. 15/482,506, filed on Apr. 7, 2017, now Pat. No. 10,019,904.

(60) Provisional application No. 62/401,599, filed on Sep. 29, 2016, provisional application No. 62/340,302, filed on May 23, 2016, provisional application No. 62/321,005, filed on Apr. 11, 2016, provisional application No. 62/321,010, filed on Apr. 11, 2016.

(51) Int. Cl.
| | | |
|---|---|---|
| *G06Q 40/08* | (2012.01) | |
| *G01C 21/36* | (2006.01) | |
| *G08G 1/14* | (2006.01) | |
| *G06Q 10/06* | (2012.01) | |
| *G08G 1/0967* | (2006.01) | |

(52) U.S. Cl.
CPC ......... *G06Q 10/0635* (2013.01); *G06Q 40/08* (2013.01); *G08G 1/096708* (2013.01); *G08G 1/148* (2013.01)

(56) References Cited

U.S. PATENT DOCUMENTS

| | | | |
|---|---|---|---|
| 5,895,169 A | 4/1999 | Holm et al. | |
| 6,161,641 A | 12/2000 | Fukumura et al. | |
| 6,632,138 B1 | 10/2003 | Serizawa et al. | |
| 6,744,349 B1 | 6/2004 | Asakura et al. | |
| 6,922,624 B2 | 7/2005 | Isaji et al. | |
| 7,175,227 B2 | 2/2007 | Menard | |
| 7,343,306 B1 | 3/2008 | Bates et al. | |
| 8,223,010 B2 | 7/2012 | Petite et al. | |
| 8,589,033 B2 | 11/2013 | Rafii et al. | |
| 8,650,799 B2 | 2/2014 | Chen | |
| 8,805,707 B2 * | 8/2014 | Schumann, Jr. ............................ G08G 1/096775 705/4 | |
| 8,938,337 B2 | 1/2015 | Nakakura et al. | |
| 8,954,340 B2 | 2/2015 | Sanchez et al. | |
| 9,020,751 B1 | 4/2015 | Bogovich et al. | |
| 9,151,995 B2 | 10/2015 | Tseng et al. | |
| 9,159,080 B2 | 10/2015 | Fiorucci et al. | |
| 9,248,823 B2 | 2/2016 | MacNeille et al. | |
| 9,275,392 B2 | 3/2016 | Potkonjak | |
| 9,378,462 B2 | 6/2016 | Davidoff | |
| 9,393,961 B1 | 7/2016 | Templeton et al. | |
| 9,396,599 B1 | 7/2016 | Malhotra | |
| 9,487,139 B1 | 11/2016 | Ishida et al. | |
| 9,514,629 B2 | 12/2016 | Chen et al. | |
| 9,558,520 B2 * | 1/2017 | Peak ................ G16H 40/67 | |
| 9,587,952 B1 | 3/2017 | Slusar | |
| 9,625,266 B1 | 4/2017 | Chintakindi | |
| 9,637,965 B1 | 5/2017 | Kothari | |
| 9,723,469 B2 * | 8/2017 | Truong ............... G08G 1/0104 | |
| 9,734,685 B2 | 8/2017 | Fields et al. | |
| 9,755,851 B2 | 9/2017 | Grimm et al. | |
| 9,762,601 B2 * | 9/2017 | Truong ............... G06Q 10/083 | |
| 9,816,827 B1 | 11/2017 | Slusar | |
| 9,845,048 B1 | 12/2017 | Tseng et al. | |
| 10,017,975 B2 | 7/2018 | Broadhead et al. | |
| 10,019,904 B1 * | 7/2018 | Chan ..................... G08G 1/205 | |
| 10,026,309 B1 | 7/2018 | Nepomuceno et al. | |
| 10,157,422 B2 | 12/2018 | Jordan Peters et al. | |
| 10,161,175 B2 | 12/2018 | Elie et al. | |
| 10,204,518 B1 | 2/2019 | Nepomuceno et al. | |
| 10,222,228 B1 | 3/2019 | Chan et al. | |
| 10,229,645 B2 | 3/2019 | Yamaguchi et al. | |
| 10,233,679 B1 | 3/2019 | Chan et al. | |
| 10,247,565 B2 | 4/2019 | Nepomuceno et al. | |
| 10,282,981 B1 | 5/2019 | Nepomuceno et al. | |
| 10,317,907 B2 | 6/2019 | Shami | |
| 10,403,150 B1 * | 9/2019 | Nepomuceno ......... G06Q 40/08 | |
| 10,428,559 B1 | 10/2019 | Nepomuceno et al. | |
| 10,431,082 B2 | 10/2019 | Yaldo et al. | |
| 10,486,708 B1 | 11/2019 | Chan et al. | |
| 10,520,949 B2 | 12/2019 | Hasberg et al. | |
| 10,571,283 B1 | 2/2020 | Nepomuceno et al. | |
| 10,584,518 B1 | 3/2020 | Chan et al. | |
| 10,593,197 B1 | 3/2020 | Nepomuceno et al. | |
| 10,641,611 B1 | 5/2020 | Nepomuceno et al. | |
| 2001/0021667 A1 | 9/2001 | Fujimoto et al. | |
| 2006/0006701 A1 | 1/2006 | Wells | |
| 2006/0200726 A1 | 9/2006 | Gittins et al. | |
| 2006/0212344 A1 | 9/2006 | Marcus et al. | |
| 2006/0265746 A1 | 11/2006 | Farley et al. | |
| 2006/0282270 A1 | 12/2006 | Sheets et al. | |
| 2007/0152804 A1 | 7/2007 | Breed et al. | |
| 2008/0074246 A1 | 3/2008 | Isaji et al. | |
| 2009/0002141 A1 | 1/2009 | Rinaldi | |
| 2009/0027188 A1 | 1/2009 | Saban | |
| 2009/0037088 A1 | 2/2009 | Taguchi | |
| 2009/0189373 A1 | 7/2009 | Schramm et al. | |
| 2009/0204319 A1 | 8/2009 | Shanbhag et al. | |
| 2009/0224879 A1 | 9/2009 | Nakazawa et al. | |
| 2009/0299547 A1 | 12/2009 | Becker et al. | |
| 2010/0191584 A1 | 7/2010 | Fraser et al. | |
| 2011/0040579 A1 | 2/2011 | Havens | |
| 2011/0161116 A1 * | 6/2011 | Peak ................... G01C 21/36 705/4 | |
| 2011/0213628 A1 * | 9/2011 | Peak ................... G06Q 40/08 705/4 | |
| 2011/0260848 A1 | 10/2011 | Rodriguez Barros et al. | |
| 2012/0065858 A1 | 3/2012 | Nickolaou et al. | |
| 2012/0096905 A1 | 4/2012 | Yamagata et al. | |
| 2012/0100911 A1 | 4/2012 | Rejen | |
| 2012/0123806 A1 * | 5/2012 | Schumann, Jr. ........ G06Q 40/08 705/4 | |
| 2012/0135382 A1 * | 5/2012 | Winston ............... G09B 19/167 434/65 | |
| 2012/0166229 A1 | 6/2012 | Collins et al. | |
| 2012/0194356 A1 | 8/2012 | Haines et al. | |
| 2012/0224062 A1 | 9/2012 | Lacoste et al. | |
| 2012/0236319 A1 | 9/2012 | Gotou et al. | |
| 2012/0296493 A1 | 11/2012 | Wakao | |
| 2012/0326889 A1 | 12/2012 | Kabler et al. | |
| 2013/0147638 A1 | 6/2013 | Ricci | |
| 2013/0214939 A1 | 8/2013 | Washlow et al. | |
| 2013/0219318 A1 | 8/2013 | Schreiber et al. | |
| 2013/0265174 A1 | 10/2013 | Scofield et al. | |
| 2014/0005907 A1 | 1/2014 | Bajpai | |
| 2014/0097957 A1 | 4/2014 | Breed et al. | |
| 2014/0118130 A1 | 5/2014 | Chang et al. | |
| 2014/0143061 A1 | 5/2014 | Abhyanker | |
| 2014/0276090 A1 | 9/2014 | Breed | |
| 2014/0309855 A1 | 10/2014 | Tran | |
| 2014/0350970 A1 * | 11/2014 | Schumann, Jr. ........ G06Q 40/08 705/4 | |
| 2015/0070136 A1 | 3/2015 | Kameyama et al. | |
| 2015/0104071 A1 * | 4/2015 | Martin ................. G08G 1/0129 382/104 | |
| 2015/0106010 A1 * | 4/2015 | Martin ................. G08G 1/0129 701/410 | |
| 2015/0192660 A1 | 7/2015 | Dickow et al. | |
| 2015/0197248 A1 | 7/2015 | Breed et al. | |
| 2015/0198951 A1 | 7/2015 | Thor et al. | |
| 2015/0203035 A1 | 7/2015 | Watanabe | |
| 2015/0294431 A1 | 10/2015 | Fiorucci et al. | |
| 2016/0002959 A1 | 1/2016 | Javadzadeh et al. | |
| 2016/0006922 A1 | 1/2016 | Boudreau et al. | |
| 2016/0009252 A1 | 1/2016 | Jeong | |
| 2016/0050315 A1 | 2/2016 | Malhotra et al. | |

(56) References Cited

U.S. PATENT DOCUMENTS

| | | |
|---|---|---|
| 2016/0068156 A1 | 3/2016 | Horii |
| 2016/0071418 A1 | 3/2016 | Oshida et al. |
| 2016/0144841 A1 | 5/2016 | White |
| 2016/0163217 A1 | 6/2016 | Harkness |
| 2016/0189303 A1 | 6/2016 | Fuchs |
| 2016/0207540 A1 | 7/2016 | Liu et al. |
| 2016/0259341 A1* | 9/2016 | High .................... G05D 1/0214 |
| 2016/0362118 A1 | 12/2016 | Mollicone et al. |
| 2016/0373473 A1* | 12/2016 | Truong ................ G08G 1/0104 |
| 2016/0375883 A1 | 12/2016 | Harrer |
| 2017/0028907 A1 | 2/2017 | Chen |
| 2017/0032673 A1 | 2/2017 | Scofield et al. |
| 2017/0039850 A1 | 2/2017 | Berg et al. |
| 2017/0132914 A1 | 5/2017 | Dannat et al. |
| 2017/0138108 A1 | 5/2017 | Kothari |
| 2017/0161614 A1 | 6/2017 | Mehta et al. |
| 2017/0174221 A1 | 6/2017 | Vaughn et al. |
| 2017/0218678 A1 | 8/2017 | Kothari |
| 2017/0228604 A1 | 8/2017 | Ferguson et al. |
| 2017/0235305 A1 | 8/2017 | Jung et al. |
| 2017/0236416 A1 | 8/2017 | Dannat et al. |
| 2017/0241791 A1 | 8/2017 | Madigan et al. |
| 2017/0334459 A1 | 11/2017 | Mcnew |
| 2017/0371339 A1 | 12/2017 | Charette et al. |
| 2018/0001890 A1 | 1/2018 | Ratcliffe |
| 2018/0032071 A1 | 2/2018 | Wieneke |
| 2018/0032891 A1 | 2/2018 | Ba et al. |
| 2018/0072271 A1 | 3/2018 | Yiwei et al. |
| 2018/0081357 A1 | 3/2018 | Datta Gupta et al. |
| 2018/0118209 A1 | 5/2018 | Suzuki et al. |
| 2018/0150079 A1 | 5/2018 | Isozaki |
| 2018/0233047 A1 | 8/2018 | Mandeville-Clarke |
| 2018/0304898 A1 | 10/2018 | Yoshikawa et al. |
| 2019/0176737 A1 | 6/2019 | Watanabe |
| 2019/0211587 A1 | 7/2019 | Ganeshan et al. |

OTHER PUBLICATIONS

Lee et al., A VDS Based Traffic Accident Prediction Analysis and Future Application, IN: Nguyen et al. (eds.), Agent and Multi-Agent Systems: Technologies and Applications. KES-AMSTA 2007. Lecture Notes in Computer Science, vol. 4496, Springer, Berlin (2007).

Naji et al., Shortcomings in Road Accident Data in Developing Countries, Identification and Correction: A Case Study, IATSS Research, 24(2):66-74 (2000).

An Introduction to the Highway Safety Manual, American Association of State Highway and Transportation Officials, downloaded from the Internet at <http://www.highwaysafetymanual.org/Pages/default.aspx> (made publicly available before Apr. 2017).

Donlon, "Hyundai Debuts New Safe Exit Assist System to Keep Passengers from Opening Car Doors Too Soon", Engineering 360, Jul. 11, 2018; 2 pages. Year: 2018).

Fingas, Waze warns you about dangerous intersections in big US cities, downloaded from the Internet at: <https://www.engadget.com/2016/03/23/waze-warns-about-dangerous-intersections/> (Mar. 23, 2016).

Highway Performance Monitoring System Traffic Data for High Volumes Routes: Best Practices and Guidelines Final Report (Sep. 8, 2004).

Map of Detroit—Claims at Intersections (May 2018).

Roadway Information Database (RID), Iowa State University, Center for Transportation Research and Education, downloaded from the Internet at: <http://www.ctre.iastate.edu/shrp2-rid/rid.cfm> (2014).

Sayed et al., Evaluating the Safety Benefits of the Insurance Corporation of British Columbia Road Improvement Program using a Full Bayes Approach, Transportation Research Board 2016 Annual Meeting (Nov. 15, 2015).

Shah, Accident Heat Map for Chicago (2015).

Wilkinson et al., The History of the Cluster Heat Map, The American Statistician, 63(2):179-84 (May 2009).

* cited by examiner

SYSTEM FOR IDENTIFYING HIGH RISK PARKING LOTS

CROSS REFERENCE TO RELATED APPLICATIONS

This application is a continuation of, and claims the benefit of, U.S. patent application Ser. No. 16/513,874, filed Jul. 17, 2019 and entitled "System for Identifying High Risk Parking Lots," which is a continuation of U.S. patent application Ser. No. 16/233,578 (now U.S. Pat. No. 10,403,150, filed Dec. 18, 2018 and entitled "System for Identifying High Risk Parking Lots," which is a continuation of U.S. patent application Ser. No. 15/951,275 (now U.S. Pat. No. 10,204,518), filed Apr. 12, 2018 and entitled "System for Identifying High Risk Parking Lots," which is a continuation of U.S. patent application Ser. No. 15/482,506 (now U.S. Pat. No. 10,019,904), filed Apr. 7, 2017 and entitled "System for Identifying High Risk Parking Lots," the disclosures of which are incorporated herein by reference in their entireties.

This application claims priority to and the benefit of the filing date of (1) provisional U.S. Application Ser. No. 62/321,005, filed Apr. 11, 2016 and entitled "Device for Detecting and Visualizing High Risk Intersections and Other Areas," (2) provisional U.S. Application Ser. No. 62/321,010, filed Apr. 11, 2016 and entitled "ANALYZING AUTO CLAIM AND VEHICLE COLLISION DATA TO IDENTIFY HAZARDOUS AREAS AND REDUCE VEHICLE COLLISIONS," (3) provisional U.S. Application Ser. No. 62/340,302, filed May 23, 2016 and entitled "Analyzing Auto Claim and Vehicle Collision Data to Identify Hazardous Areas and Reduce Vehicle Collisions," and (4) provisional U.S. Application Ser. No. 62/401,599, filed Sep. 29, 2016 and entitled "System for Identifying High Risk Parking Lots," the entire disclosures of which are incorporated herein by reference.

TECHNICAL FIELD

This disclosure relates to a device for detecting and visualizing high-risk parking lots and other areas for vehicle drivers.

BACKGROUND

Drivers and passengers assume a certain degree of risk of injury or property damage when travelling by vehicle. This risk may be mitigated by reducing or eliminating certain contributing factors. For example, a driver may avoid risky behavior, such as driving while intoxicated, driving while tired, or driving while texting. As another example, a driver may mitigate the risk of serious injury by driving a car with safety features such as airbags, seatbelts, and antilock brakes.

However, certain risk factors may not be mitigated. For example, the very nature of a vehicle may present certain inherent risks. A typical car may weigh thousands of pounds and may not always maneuver or stop quickly. When travelling at even a moderate speed, a collision may result in serious damage to the vehicle and serious injury to the occupants. Further, a driver may have no control over perhaps the greatest risk factor involved with driving: other drivers. Furthermore, a vehicle, particularly an unattended vehicle, may at any time be at risk of theft and/or vandalism.

These risks are particularly present in the case of parking lots. In addition to the collision risks faced by a vehicle entering or existing a parking lot, a vehicle within a parking lot may continue to be at risk of collision as a result of insufficient turning radii along circulating roads and parking aisles, constrained or minimally-sized parking spaces available for each vehicle, that result in close proximity to other vehicles, and visual obstruction caused by structural columns and features, landscaping or other parked vehicles. Further, a vehicle within a parking lot, by its very nature, is known to likely be unattended, placing the vehicle at a potentially increased risk of theft and/or vandalism.

Vehicle collisions and theft may result in significant damages to, or even total losses of, vehicles. Vehicle collision and theft may require extensive resources to rectify, such as monies and time. The vehicle damage may negatively impact those involved, and may be time consuming and lead to annoyance or inconvenience. Vehicle collisions and theft may also suffer from other drawbacks, such as requiring public resources to facilitate a response, such as police and medical personal. The present embodiments may overcome these and/or other deficiencies.

SUMMARY

The present embodiments disclose systems and methods that may relate to, inter alia, vehicle collisions, and/or identifying hazardous areas, in particular parking lots, that are associated with an above average amount of vehicle collisions and/or theft. Systems and methods may use historical auto insurance claim data and/or other data (such as vehicle collision data, mobile device data, telematics data, vehicle mounted-sensor or image data, autonomous vehicle sensor or image data, and/or smart infrastructure sensor or image data) to determine hazardous areas that are prone to induce, or be associated with, vehicle collisions.

In one embodiment, a computer-implemented method may be provided. The method may include (1) analyzing, via one or more processors, auto insurance claim data to identify hazardous areas, the hazardous area being defined, at least in part, by GPS location or GPS coordinates; (2) building or generating, via the one or more processors, a virtual navigation map of roads within the hazardous area, the virtual navigation map being visually depicted; (3) identifying, via the one or more processors, public parking lots within the virtual navigation map, and determining whether each public parking lot is associated with a hazardous area or not; (4) determining, via the one or more processors, that a vehicle is approaching or parking in a public parking lot associated with a hazardous area; (5) selecting, via the one or more processors, a nearby public parking lot that is not associated with a hazardous area; (6) generating, via the one or more processors, a route from the current position to the nearby public parking lot that is not associated with a hazardous area; and/or (7) routing, via one or more transceivers and/or the one or more processors, the vehicle to the nearby public parking lot using the generated route. Additional, fewer, or modified elements of the method may be possible.

In another embodiment, a computer system may be provided. The system may comprise (1) one or more processors; and (2) one or more memories storing computer-executable instructions that, when executed, cause the processor to: (i) analyze auto insurance claim data to identify hazardous areas, the hazardous areas being defined, at least in part, by GPS location or GPS coordinates, (ii) build or generate a virtual navigation map of roads within the hazardous area, the virtual navigation map being visually depicted, (iii) identify public parking lots within the virtual navigation map, and determine whether each parking lot is associated with a hazardous area or not; (iv) determine that a vehicle is approaching or parking in a public parking lot associated with a hazardous area; (v) select a nearby public parking lot that is not associated with a hazardous area; (vi) generate a route from a current position to the nearby public parking lot that is not associated with a hazardous area; and/or (vii) route or reroute the vehicle to the nearby public parking lot using the generated route. Additional, fewer, or modified system components may be possible.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

There are shown in the drawings arrangements which are presently discussed, it being understood, however, that the present embodiments are not limited to the precise arrangements and instrumentalities shown, wherein.

DETAILED DESCRIPTION

Figure 1A:
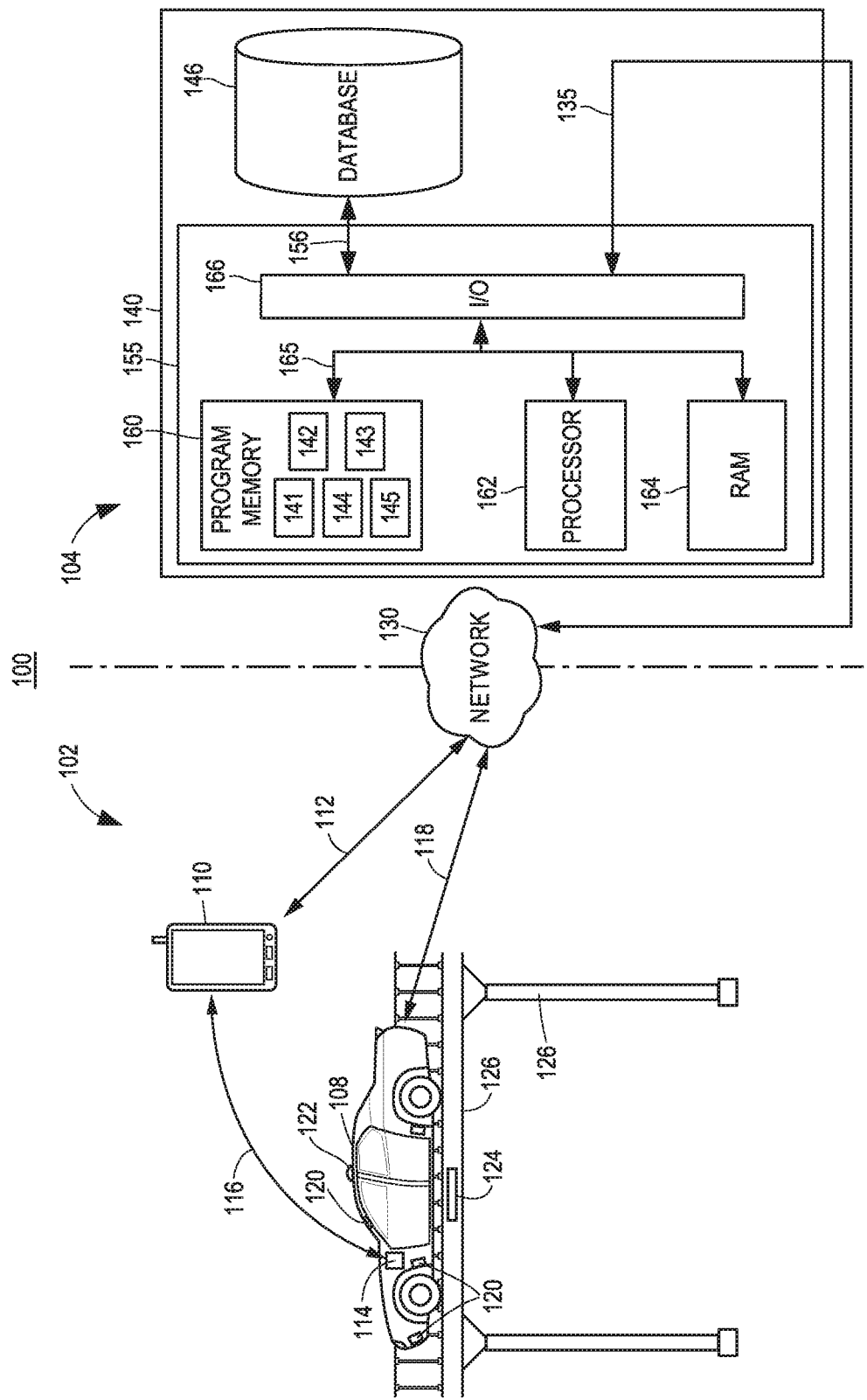
FIG. 1A illustrates a block diagram of an exemplary interconnected wireless communication network that is configured to collect customer data (which may include telematics data, mobile device data, vehicle-mounted sensor data; auto insurance claim data, autonomous vehicle data, etc.)

The present embodiments may relate to, inter alia, identifying hazardous areas, in particular parking lots, using auto insurance claim, vehicle collision data, and/or other data. Virtual navigation maps depicting the hazardous areas may be generated and used to re-route autonomous or other vehicles, bicyclists, and/or pedestrians to avoid the hazardous areas. Also, alerts may be generated to notify drivers, bicyclists, and/or pedestrians of an approaching hazardous area and/or type of hazards presented by the area. Further, based upon the type of hazards presented, autonomous features may be recommended to be engaged or disengaged if the vehicle is going to travel through the hazardous area.

Identifying Hazardous Areas Using Auto Claim & Vehicle Collision Data

The present embodiments relate to identifying risks associated with hazardous areas or intersections, portions of roads, or other areas, including high risk intersections and road segments. Vehicle collision data may be gathered from various sources, such as from processors, transceivers, sensors, and/or cameras associated with smart infrastructure, smart or autonomous vehicles, mobile devices, and/or various sensors. The vehicle collision data may also be associated with actual insurance claims arising from real world vehicle collisions, such as data scrubbed of personal information, or otherwise de-identified auto insurance claim data. In one embodiment, actual claim images (such as mobile device images of damaged vehicles, or images acquired via vehicle-mounted cameras and/or sensors) may be analyzed to associate an amount of physical damage shown in one or more images of a vehicle involved in a vehicle collision with a repair or replacement cost of the vehicle. The actual claim images may be used to estimate repair or replacement cost for vehicles involved in past, more recent, or current vehicle collisions.

Further, past or current vehicle collision data may be analyzed to determine a cause of each vehicle collision, such as identify one or more vehicles or vehicle drivers at fault, faulty street signs or traffic lights, missing stop or other traffic signs, road construction, blind spots, irregular or unusual traffic flows (causing driver confusion or autonomous vehicle confusion), weather conditions, traffic conditions, etc.

The vehicle collision data may be used to generate an electronic alert or indication to a driver or an autonomous vehicle. The alert may indicate an approaching hazardous area that has been identified by the vehicle collision data or auto insurance claim data. Once notified of a hazardous area, an autonomous vehicle may reroute itself around the hazardous area, such as take an alternative route to avoid a high risk road segment or confusing traffic pattern. Additionally or alternatively, an autonomous vehicle may engage or disengage certain autonomous features when approaching, and/or traveling through, a hazardous area. For instance, hazardous areas may be classified, such as including an exit ramp, on-ramp, circular traffic pattern, intersection, road construction or daily changing traffic flow, abnormal traffic flow, narrowing number of lanes (such as 5 lanes becoming 4 or even 3 lanes leading to traffic backups), the temporary occurrence of inclement weather that contributes to suboptimal road surface conditions, traffic merging from the left or in another abnormal manner, etc.

The present embodiments may collect vehicle collision data associated with vehicles involved in vehicle collisions while being manually driven, as well as being autonomously driven. The vehicle collision data may be analyzed to determine whether certain intersections or road segments, or other hazardous areas, are safer when vehicles traveling through them are manually or autonomously driven, or are safer when specific autonomous features or systems or engaged or disengaged for specific types of hazardous areas.

The vehicle collision data may also include indications or images of the environment of the hazardous area before, during, and/or after the vehicle collision. For instance, the vehicle collision data may be analyzed to determine traffic light operation and status before a vehicle collision. The vehicle collision data may be analyzed to determine whether pedestrian walk lights and/or smart infrastructure are leading to, or causing, vehicle collisions. As an example, a traffic light may change to rapidly for traffic conditions, or may not allow enough time for pedestrians to cross the road. Two or more traffic lights at a given intersection may not be synchronized correctly.

To facilitate diverting vehicle, bicycle, and/or pedestrian traffic from hazardous areas of road, such as high risk intersections or road segments, a toll may be charged for using the hazardous area of road. Vehicle transponders, or wearable electronics on bicyclists or joggers/walkers, may communicate with smart infrastructure and deposit a given amount of money from a virtual account of the user each time the user uses, or travels through, the hazardous area of road.

The vehicle collision data (including the auto insurance claim data) may be used to determine when (e.g., a time of day) and/or under what environment conditions that the hazardous area is at a lower or higher risk of vehicle collision. Certain road areas may be more problematic during rush hour or at night, or when under construction, or when it is raining or snowing. The vehicle collision data may be used to identify a time of year that the hazardous area is at a lower or elevated risk, such as certain bridges or ramps may be at a higher risk when the weather includes freezing rain or ice during winter months.

A virtual map of the hazardous areas may be downloaded and displayed for user review. A heads up display of each hazardous area may be displayed on a dashboard of user's vehicle when the user's vehicle is within a predetermined distance of the hazardous area, such as one mile, and traveling along a route to the hazardous area. The virtual map may alternatively be displayed on an in-board navigation unit of the user's vehicle, or via a mobile device or wearable electronics device display. The virtual map may be superimposed on a windshield, such as on the passenger's side of the windshield, in other embodiments.

The present embodiments may provide a remote server that (i) collects vehicle collision data via wireless communication or data transmission over one or more radio links or wireless communication channels; (ii) determines hazardous areas from the vehicle collision data and/or auto claim data (which may include past or current vehicle collision location, time, day, extent of damage, and/or cause information); and (iii) generates a virtual navigation map of the hazardous areas. After which, the remote server may transmit the hazardous area information and recommendations to vehicles, mobile devices, or wearable electronics of a user via wireless communication or data transmission over one or more radio links or wireless communication channels. With the user's permission, whether or not the travel recommendations are followed by the user or by the user's autonomous vehicle may be tracked, and the results or frequency of the user or the user's vehicle following the recommendations to reduce risk of vehicle collision may be transmitted to the remote server. After which, the remote server may update or adjust an auto, personal, health, or other insurance premium or discount to reflect risk averse behavior of the user.

The recommendations may include that an autonomous or semi-autonomous vehicle engage one or more autonomous or semi-autonomous features or systems at a predetermined distance prior to reaching the hazardous area, such as one or more miles. It may be recommended that vehicle equipped with fully autonomous functionality engage that functionality prior to entering the hazardous area if the functionality has proven to be less risky or safer that manual driving or manual vehicle operation during the same type of hazardous area approaching.

For instance, traffic patterns that require a human driver to attend to two or more things—such as speed (accelerating or braking), changing lanes (merging with traffic, leaving one flow of traffic for another, signaling lanes changes, determining when to exit or what road to take, weather, traffic lights, traffic signs, detours resulting from road closures, road maintenance or construction, or motor vehicle collision, etc.—may be confusing for a human driver driving in unfamiliar territory or on new roads. In such instances, such as for circular traffic patterns, intersections, exist ramps, on-ramps, etc., an autonomous vehicle may perform better than average humans, or with less risk or chance of vehicle collision.

The present embodiments may determine a score for each hazardous area identified, and if a score is greater than a predetermined threshold, then a vehicle with autonomous or self-driving functionality may automatically, or at the direction of a human driver or passenger, engage one or more autonomous features or systems at a predetermined distance from the hazardous area. The autonomous feature(s) may then disengage at a predetermined distance from the hazardous area once manually-controlled driving has resumed, or after the driver has indicated that she is ready to reassume direct control of the vehicle.

The present embodiments may also use the vehicle collision data to determine low risk or safer routes for bicyclists and/or pedestrians to follow that avoid higher risk areas. As an example, risk avoidance routes may be developed for school children to follow before and after school, whether on foot or bike. Bicyclists may be routed in city traffic along lower risk routes, such as in the direction that is along with one-way traffic flow, and/or along routes with fewer intersections or bike paths or bridges.

The present embodiments may include smart infrastructure, such as smart traffic lights, equipped with various sensors, such as radar units that may detect vehicle speed. If an approaching vehicle is traveling over a given amount of speed, the smart traffic light may change (green, yellow, or red) lights repeatedly, or flash the lights, to give the vehicle and/or driver an indication of an approaching intersection and/or that the vehicle is traveling too fast and needs to slow down, or even come to a halt at the intersection.

The hazardous areas may be characterized as to why they are high risk. For example, certain intersections or portions of roads may be associated with a higher-than-average number of vehicle, bicycle, and/or pedestrian collisions, a higher amount of traffic, an extensive duration or scope of road construction or maintenance, abnormal traffic patterns, auto insurance claims including more serious vehicle damage or pedestrian and passenger damages, an increase in collision frequency related to the occurrence of inclement weather that temporarily affects road surface quality (water, snow, ice) and visibility (fog, rain) etc.

Other hazardous areas may be associated with parking lots that have an abnormally high amount of vehicle collisions and/or vehicle theft. High risk parking lots may be identified and mapped. Vehicles, including autonomous vehicles, may be notified of the high risk parking lots and alternate parking lots associated with lower risk, such as associated with fewer vehicle collisions or stolen vehicles, may be identified or selected. The vehicles may be routed or re-routed to the alternate parking lots associated with lower risk to facilitate safer vehicle operation and reduce vehicle theft.

Exemplary Autonomous Vehicle Operation System

FIG. 1A illustrates a block diagram of an exemplary interconnected wireless communication system 100 that is configured to collect customer data, such as customer data generated or collected by mobile devices; smart infrastructure, various sensors and cameras, and/or autonomous or smart vehicle monitoring systems—on which the exemplary methods described herein may be implemented. The customer data may detail, or be associated with, vehicle collisions or near collisions.

The customer data may be generated and/or collected by mobile device-mounted sensors, vehicle-mounted sensors, and/or smart infrastructure-mounted sensors. The sensors may include cameras and other sensors mentioned herein. The sensor data may be collected before, during, and/or after vehicle collisions. The high-level architecture may include both hardware and software applications, as well as various data communications channels for communicating data between the various hardware and software components.

The communication system 100 may be roughly divided into front-end components 102 and back-end components 104. The front-end components 102 may obtain information regarding a customer from a number of computing devices, such as wearable electronics (e.g., an augmented reality appliance) or mobile devices 110, smart home controllers, smart bicycles, and vehicles 108 (e.g., a car, truck, motorcycle, etc.), smart infrastructure, and the surrounding environment.

With respect to the vehicles 108, an on-board computer 114 may generate or collect various types of information from vehicle-mounted sensors. For instance, an autonomous vehicle may collect data related to the autonomous features to assist the vehicle operator in operating the vehicle 108. To monitor the vehicle 108, the front-end components 102 may include one or more sensors 120 installed within the vehicle 108 that may communicate with the on-board computer 114. The front-end components 102 may further process the sensor data using the on-board computer 114 or a mobile device 110 (e.g., a smart phone, a tablet computer, a special purpose computing device, smart watch, wearable electronics such as an augmented reality appliance, etc.) to determine when the vehicle is in operation and information regarding the vehicle, such as GPS or other location data.

In some embodiments of the system 100, the front-end components 102 may communicate with the back-end components 104 via a network 130. Either the on-board computer 114 or the mobile device 110 may communicate with the back-end components 104 via the network 130 to allow the back-end components 104 to record information regarding vehicle or mobile device usage, including vehicle or mobile device GPS data, video data, and/or telematics data. The back-end components 104 may use one or more servers 140 to receive data from the front-end components 102, store the received data, process the received data, and/or communicate information associated with the received or processed data.

The front-end components 102 may be disposed within or communicatively connected to one or more on-board computers 114, which may be permanently or removably installed in the vehicle 108. The on-board computer 114 may interface with the one or more sensors 120 within the vehicle 108 (e.g., a digital camera, a video camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, etc.), which sensors may also be incorporated within or connected to the on-board computer 114.

The front end components 102 may further include a communication component 122 to transmit information to and receive information from external sources, including other vehicles, infrastructure, smart home controllers or sensors, or the back-end components 104. In some embodiments, the mobile device 110 may supplement the functions performed by the on-board computer 114 described herein by, for example, sending or receiving information to and from the mobile server 140 via the network 130, such as over one or more radio frequency links or wireless communication channels. In other embodiments, the on-board computer 114 may perform all of the functions of the mobile device 110 described herein, in which case no mobile device 110 may be present in the system 100.

Either or both of the mobile device 110 or on-board computer 114 (and/or a smart home controller, sensor, or processor) may communicate with the network 130 over links 112 and 118, respectively. Either or both of the mobile device 110 or on-board computer 114 (and/or a smart home controller, sensor, or processor) may run a Data Application for collecting, generating, processing, analyzing, transmitting, receiving, and/or acting upon customer data associated with the vehicle 108 (e.g., sensor data, route and/or destination data, GPS data) or the vehicle environment (e.g., other vehicles operating near the vehicle 108). Additionally, the mobile device 110 and on-board computer 114 (and/or smart home controller or computer) may communicate with one another directly over link 116 or indirectly over multiple radio links, and/or may be configured for vehicle navigation and/or virtual map display.

The mobile device 110 may be either a general-use personal computer, cellular phone, smart phone, tablet computer, smart watch, wearable electronics, vehicle navigation device, or a dedicated vehicle monitoring or control device. Although only one mobile device 110 is illustrated, it should be understood that a plurality of mobile devices 110 may be used in some embodiments, such as mobile devices associated with a family or household. The on-board computer 114 may be a general-use on-board computer capable of performing many functions relating to vehicle operation or a dedicated computer for autonomous vehicle operation. Further, the on-board computer 114 may be originally installed by the manufacturer of the vehicle 108, or installed as an aftermarket modification or addition to the vehicle 108. In some embodiments or under certain conditions, the mobile device 110 or on-board computer 114 (or smart home controller) may function as thin-client devices that outsource some or most of the processing to the server 140.

The sensors 120 may be removably or fixedly installed within the vehicle 108 and may be disposed in various arrangements to provide information generation and collection of customer data, and/or to provide information to the autonomous operation features. Among the sensors 120 may be included one or more of a GPS unit, a radar unit, a LIDAR unit, an ultrasonic sensor, an infrared sensor, an inductance sensor, a camera, an accelerometer, a tachometer, or a speedometer. Some of the sensors 120 (e.g., radar, LIDAR, or camera units) may actively or passively scan the vehicle environment for obstacles (e.g., other vehicles, buildings, pedestrians, etc.), roadways, lane markings, signs, or signals. Other sensors 120 (e.g., GPS, accelerometer, or tachometer units) may provide data for determining the location or movement of the vehicle 108. Other sensors 120 may be directed to the interior or passenger compartment of the vehicle 108, such as cameras, microphones, pressure sensors, thermometers, or similar sensors to monitor the vehicle operator and/or passengers within the vehicle 108.

Information generated or received by the sensors 120 may be communicated to the on-board computer 114 or the mobile device 110 and/or smart home controller or smart infrastructure—such as collected and analyzed as the customer data discussed herein.

In further embodiments, the front-end components may include an infrastructure communication device 124 for monitoring the status of one or more infrastructure components 126. Infrastructure components 126 may include roadways, bridges, traffic signals, gates, switches, crossings, parking lots or garages, toll booths, docks, hangars, or other similar physical portions of a transportation system's infrastructure. The infrastructure communication device 124 may include or be communicatively connected to one or more sensors (not shown) for detecting information relating to the condition of the infrastructure component 126. The sensors (not shown) may generate data relating to weather conditions, traffic conditions, or operating status of the infrastructure component 126.

The infrastructure communication device 124 may be configured to receive the sensor data generated and determine a condition of the infrastructure component 126, such as weather conditions, road integrity, construction, traffic, available parking spaces, etc. The infrastructure communication device 124 may further be configured to communicate information to vehicles 108 via the communication component 122. In some embodiments, the infrastructure communication device 124 may receive information from one or more vehicles 108, while, in other embodiments, the infrastructure communication device 124 may only transmit information to the vehicles 108. The infrastructure communication device 124 may be configured to monitor vehicles 108 and/or directly or indirectly communicate information to other vehicles 108 and/or to mobile devices 110.

In some embodiments, the communication component 122 may receive information from external sources, such as other vehicles, mobile devices, smart home controllers, or infrastructure. The communication component 122 may also send information regarding the vehicle 108 to external sources, such as mobile devices or smart home controllers. To send and receive information, the communication component 122 may include a transmitter and a receiver designed to operate according to predetermined specifications, such as the dedicated short-range communication (DSRC) channel, wireless telephony, Wi-Fi, or other existing or later-developed communications protocols. The received information may supplement the data received from the sensors 120. For example, the communication component 122 may receive information that an autonomous vehicle ahead of the vehicle 108 is reducing speed, allowing the adjustments in an autonomous operation of the vehicle 108, if the vehicle is an autonomous or semi-autonomous vehicle.

In addition to receiving information from the sensors 120, the on-board computer 114 may directly or indirectly control the operation of the vehicle 108 according to various autonomous operation features. The autonomous operation features may include software applications or modules implemented by the on-board computer 114 to generate and implement control commands to control the steering, braking, or throttle of the vehicle 108. To facilitate such control, the on-board computer 114 may be communicatively connected to control components of the vehicle 108 by various electrical or electromechanical control components (not shown). When a control command is generated by the on-board computer 114, it may thus be communicated to the control components of the vehicle 108 to effect a control action. In embodiments involving fully autonomous vehicles, the vehicle 108 may be operable only through such control components (not shown). In other embodiments, the control components may be disposed within or supplement other vehicle operator control components (not shown), such as steering wheels, accelerator or brake pedals, or ignition switches.

In some embodiments, the front-end components 102 (such as mobile devices, smart vehicles, smart homes, or other customer computers) communicate data (including the customer data discussed herein) with the back-end components 104 via the network 130. The network 130 may be a proprietary network, a secure public internet, a virtual private network or some other type of network, such as dedicated access lines, plain ordinary telephone lines, satellite links, cellular data networks, combinations of these. The network 130 may include one or more radio frequency communication links, such as wireless communication links 112 and 118 with mobile devices 110 and on-board computers 114 (and/or smart home controllers), respectively. Where the network 130 comprises the Internet, data communications may take place over the network 130 via an Internet communication protocol.

The back-end components 104 may include one or more servers 140. Each server 140 may include one or more computer processors adapted and configured to execute various software applications and components. The server 140 may further include a database 146, which may be adapted to store customer and/or other data received from mobile devices, vehicles, home computers, or smart infrastructure.

Such data might include, for example, data associated with vehicle collisions or near vehicle collisions, vehicle damage, extent of injuries at a vehicle collision, vehicle collision data, number and identification of vehicles involved, dates and times of vehicle use, duration of vehicle use, mobile device GPS location, vehicle GPS location, home occupancy or vacancy information, use and settings of home electronic features (such as operation of smart electronics within the home), and vehicle telematics data, such as speed of the vehicle 108, RPM or other tachometer readings of the vehicle 108, lateral and longitudinal acceleration of the vehicle 108, vehicle incidents or near collisions of the vehicle 108, hazardous or anomalous conditions within the vehicle operating environment (e.g., construction, accidents, etc.), communication between the autonomous operation features and external sources, environmental conditions of vehicle operation (e.g., weather, traffic, road condition, etc.), errors or failures of smart infrastructure or autonomous operation features, or other data relating to use of the vehicle 108 and the autonomous operation features, which may be uploaded to the server 140 via the network 130.

The server 140 may access data stored in the database 146 when identifying high risk or hazardous areas (such as high risk intersections, roads, road segments, exit ramps, toll booths, or parking lots), executing various functions and tasks associated with mapping the hazardous areas, generating alerts of approaching hazardous areas, and/or determining new routes for vehicles, pedestrians, or bicyclists that avoid hazardous areas.

Although the system 100 is shown to include one vehicle 108, one mobile device 110, one on-board computer 114, and one server 140, it should be understood that different numbers of vehicles 108, mobile devices 110, on-board computers 114, and/or servers 140 may be utilized, including interconnected home or smart infrastructure (e.g., smart sign, road marker, bridge, road, or traffic light) processors and/or transceivers. For example, the system 100 may include a plurality of servers 140 and hundreds of mobile devices 110 or on-board computers 114, all of which may be interconnected via the network 130. Furthermore, the database storage or processing performed by the one or more servers 140 may be distributed among a plurality of servers 140 in an arrangement known as "cloud computing." This configuration may provide various advantages, such as enabling near real-time uploads and downloads of information, as well as periodic uploads and downloads of information. This may in turn support a thin-client embodiment of the mobile device 110 or on-board computer 114 discussed herein.

The server 140 may have a controller 155 that is operatively connected to the database 146 via a link 156. It should be noted that, while not shown, additional databases may be linked to the controller 155 in a known manner. For example, separate databases may be used for various types of information, such as customer mobile device or vehicle location information, tracking autonomous vehicle location, vehicle collisions, road conditions, road construction, vehicle insurance policy information or vehicle use or maintenance information. Additional databases (not shown) may be communicatively connected to the server 140 via the network 130, such as databases maintained by third parties (e.g., weather, construction, or road network databases). The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example. The controller 155 may also be operatively connected to the network 130 via a link 135.

The server 140 may further include a number of software applications stored in a program memory 160. The various software applications on the server 140 may include an autonomous operation information monitoring application 141 for receiving information regarding the vehicle 108 and its autonomous operation features (which may include control commands or decisions of the autonomous operation features), a feature evaluation application 142 for determining the effectiveness of autonomous operation features under various conditions and/or determining operating condition of autonomous operation features or components, a risk mapping application 143 for determining and electronically mapping hazardous areas, such as areas that are more prone to be associated with vehicle collisions than normal, and/or identifying the risks associated with autonomous operation feature use along a plurality of road segments associated with an electronic map, a route determination application 144 for determining routes that route a vehicle, pedestrian, or bicycle from a current GPS to a destination that avoids a hazardous area, or that route to an alternate or lower risk parking lot, and an autonomous parking application 145 for assisting in parking and retrieving an autonomous vehicle. The various software applications may be executed on the same computer processor or on different computer processors.

Figure 1B:
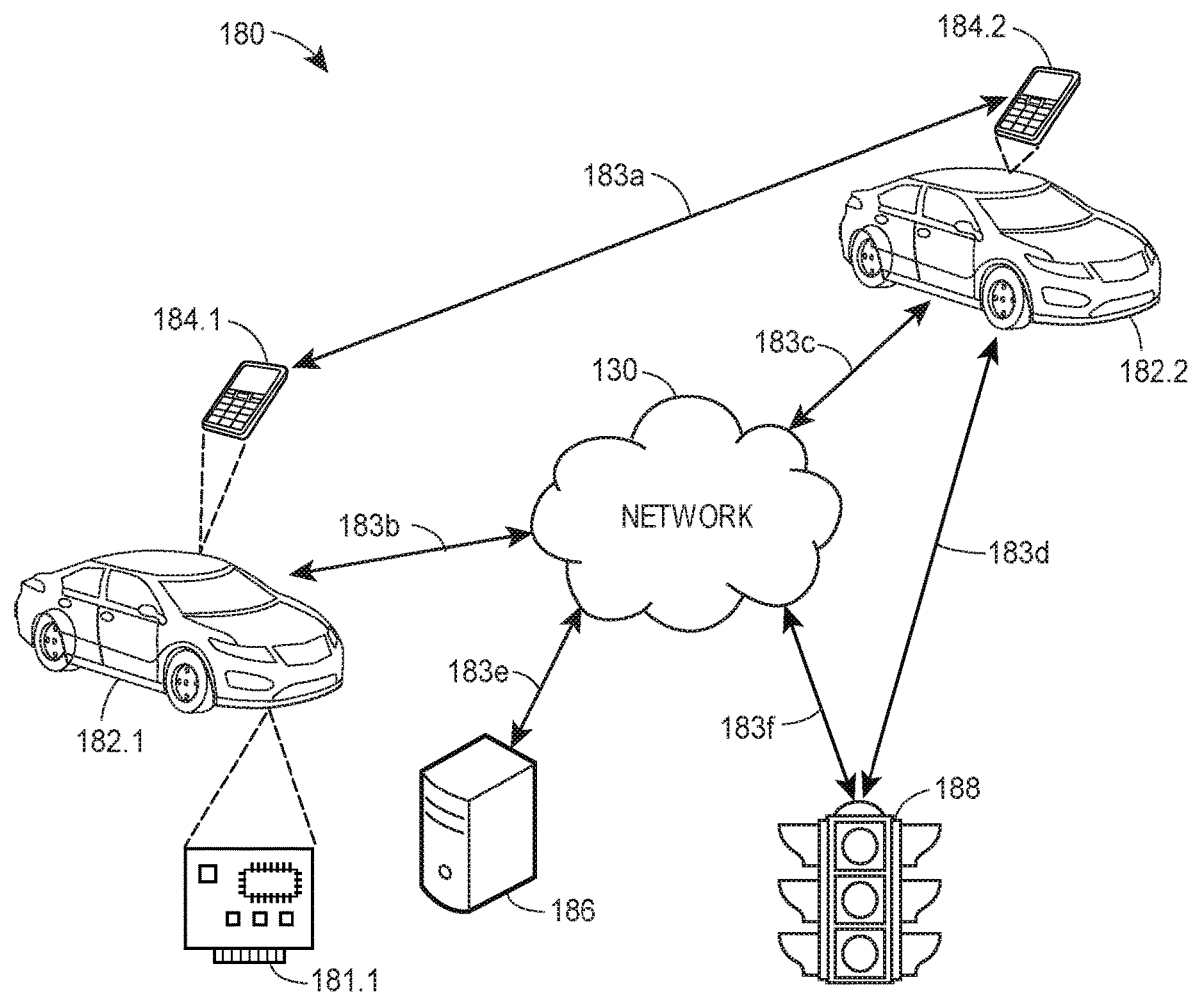
FIG. 1B illustrates a block diagram of another exemplary interconnected wireless communication network that is configured to collect customer data, such as customer data generated or collected by mobile devices; smart or interconnect home controllers; autonomous or smart vehicle monitoring systems; sensor and/or image data, and/or smart infrastructure or traffic lights.

FIG. 1B illustrates a block diagram of another wireless communication system 180 on which the exemplary methods described herein may be implemented. In one aspect, with customer permission or affirmative consent, system 180 may collect customer data, including the type of customer data discussed herein (such as auto insurance claim data and/or vehicle collision data), and include a network 130, N number of vehicles 182.1-182.N and respective mobile computing devices 184.1-184.N, an external computing device 186 (such as home computing device, or smart home controller), and/or a smart infrastructure component 188. In one aspect, mobile computing devices 184 may be an implementation of mobile computing device 110, while vehicles 182 may be an implementation of vehicle 108, including autonomous or semi-autonomous vehicles. The vehicles 182 may include a plurality of vehicles 108 having autonomous operation features, as well as a plurality of other vehicles not having autonomous operation features.

As illustrated, the vehicle 182.1 may include a vehicle controller 181.1, which may be an on-board computer 114 as discussed elsewhere herein, while vehicle 182.2 may lack such a component. Each of vehicles 182.1 and 182.2 may be configured for wireless inter-vehicle communication, such as vehicle-to-vehicle (V2V) or peer-to-peer wireless communication and/or data transmission via the communication component 122, directly via the mobile computing devices 184, or otherwise.

Although system 180 is shown in FIG. 1A as including one network 130, two mobile computing devices 184.1 and 184.2, two vehicles 182.1 and 182.2, one external computing device 186, and/or one smart infrastructure component 188, various embodiments of system 180 may include any suitable number of networks 130, mobile computing devices 184, vehicles 182, external (including home) computing devices 186, and/or infrastructure components 188. The vehicles 182 included in such embodiments may include any number of vehicles 182.$i$ having vehicle controllers 181.$n$ (such as vehicle 182.1 with vehicle controller 181.1) and vehicles 182.$j$ not having vehicles controllers (such as vehicle 182.2). Moreover, system 180 may include a plurality of external (and/or home) computing devices 186 and more than two mobile computing devices 184 configured to collect and generate customer data (such customer presence or location information, mobile device and vehicle sensor data, and/or other types of customer data), any suitable number of which being interconnected directly to one another and/or via network 130.

In one aspect, each of mobile computing devices 184.1 and 184.2 may be configured to communicate with one another directly via peer-to-peer (P2P) wireless communication and/or data transfer. In other aspects, each of mobile computing devices 184.1 and 184.2 may be configured to communicate indirectly with one another and/or any suitable device via communications over network 130, such as external computing device 186 (such as insurance or financial services provider remote servers, or a smart home controller), and/or smart infrastructure component(s) 188, for example. In still other aspects, each of mobile computing devices 184.1 and 184.2 may be configured to communicate directly and/or indirectly with other suitable devices, such as remote servers configured to collect and analyze customer data (including auto insurance claim and/or vehicle collision data) to generate customer alerts, which may include synchronous or asynchronous communication.

Each of mobile computing devices 184.1 and 184.2 may be configured to send data to and/or receive data from one another and/or via network 130 using one or more suitable communication protocols, which may be the same communication protocols or different communication protocols. For example, mobile computing devices 184.1 and 184.2 may be configured to communicate with one another via a direct radio link 183*a*, which may utilize, for example, a Wi-Fi direct protocol, an ad-hoc cellular communication protocol, etc. Mobile computing devices 184.1 and 184.2 may also be configured to communicate with vehicles 182.1 and 182.2, respectively, utilizing a BLUETOOTH communication protocol (radio link not shown). In some embodiments, this may include communication between a mobile computing device 184.1 and a vehicle controller 181.1. In other embodiments, it may involve communication between a mobile computing device 184.2 and a vehicle telephony, entertainment, navigation, or information system (not shown) of the vehicle 182.2 that provides functionality other than autonomous (or semi-autonomous) vehicle control. Thus, vehicles 182.2 without autonomous operation features may nonetheless be connected to mobile computing devices 184.2 in order to facilitate communication, information presentation, or similar non-control operations (e.g., navigation display, hands-free telephony, or music selection and presentation).

To provide additional examples, mobile computing devices 184.1 and 184.2 may be configured to communicate with one another via radio (or radio frequency) links 183*b* and 183*c* by each communicating with network 130 utilizing a cellular communication protocol. As an additional example, mobile computing devices 184.1 and/or 184.2 may be configured to communicate with external computing device (e.g., services provider remote server or a customer smart home controller) 186 via radio links 183*b*, 183*c*, and/or 183*e*. Still further, one or more of mobile computing devices 184.1 and/or 184.2 may also be configured to communicate with one or more smart infrastructure components 188 directly (e.g., via radio link 183*d*) and/or indirectly (e.g., via radio links 183*c* and 183*f* via network 130) using any suitable communication protocols. Similarly, one or more vehicle controllers 181.1 may be configured to communicate directly to the network 130 (via radio link 183*b*) or indirectly through mobile computing device 184.1 (via radio link 183*b*). Vehicle controllers 181.1 may also communicate with other vehicle controllers and/or mobile computing devices 184.2 directly or indirectly through mobile computing device 184.1 via local radio links 183*a*. As discussed elsewhere herein, network 130 may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 183*a*-183*f* may represent wired links, wireless links, or any suitable combination thereof. For example, the links 183*e* and/or 183*f* may include wired links to the network 130, in addition to, or instead of, wireless radio connections.

In some embodiments, the external computing device 186 may medicate communication between the mobile computing devices 184.1 and 184.2 based upon location or other factors, such as indication of a vehicle collision occurring or a hazardous area approaching or along a route of travel. In embodiments in which mobile computing devices 184.1 and 184.2 communicate directly with one another in a peer-to-peer fashion, network 130 may be bypassed and thus communications between mobile computing devices 184.1 and 184.2 and external computing device 186 may be unnecessary. For example, in some aspects, mobile computing device 184.1 may broadcast geographic location data and/or telematics data directly to mobile computing device 184.2. In this case, mobile computing device 184.2 may operate independently of network 130 to determine vehicle collision data, location data, operating data, risks associated with operation, control actions to be taken, which telematics data to broadcast to other local or remote computing devices, and/or alerts to be generated at mobile computing device 184.2 based upon the geographic location data, hazardous areas locations, customer data, vehicle driver, mobile device user, whether the mobile device user is walking or biking, sensor data, and/or the autonomous operation feature data. In accordance with such aspects, network 130 and external computing device 186 may be omitted.

However, in other aspects, one or more of mobile computing devices 184.1 and/or 184.2 may work in conjunction with external computing device 186 to telematics data, vehicle collision data, location data, operating data, risks associated with operation, control actions to be taken, and/or alerts to be generated. For example, in some aspects, mobile computing device 184.1 may broadcast geographic location data and/or autonomous operation feature data, which is received by external computing device 186. In this case, external computing device 186 may be configured to determine whether the same or other information should be sent to mobile computing device 184.2 based upon the hazardous area identified, the geographic location data, autonomous operation feature data, or data derived therefrom.

Mobile computing devices 184.1 and 184.2 may be configured to execute one or more algorithms, programs, applications, etc., to determine a geographic location of each respective mobile computing device (and thus their associated vehicle) to generate, measure, monitor, and/or collect one or more sensor metrics as GPS or telematics data, to broadcast the geographic data and/or telematics data via their respective radio links, to receive the geographic data and/or telematics data via their respective radio links, to determine whether an alert should be generated based upon the telematics data and/or the geographic location data, to generate the one or more alerts, and/or to broadcast one or more alert notifications to other computing devices.

Such functionality may, in some embodiments be controlled in whole or part by a Data Application ("App") operating on the mobile computing devices 184, as discussed elsewhere herein. Such Data Application may communicate between the mobile computing devices 184 and one or more external computing devices 186 (such as servers 140) to facilitate centralized data collection and/or processing.

In some embodiments, the Data Application may facilitate control of a vehicle 182 by a user, such as by selecting vehicle destinations and/or routes along which the vehicle 182 will travel. The Data Application may further be used to establish restrictions on vehicle use or store user preferences for vehicle use, such as in a user profile. In further embodiments, the Data Application may monitor mobile device or vehicle operation or, mobile device, vehicle, wearable electronic device, or home sensor data in real-time to make recommendations or for other purposes, such as described herein. The Data Application may further facilitate monitoring and/or assessment of the vehicle 182, such as by evaluating operating data to determine the condition of the vehicle or components thereof (e.g., sensors, autonomous operation features, etc.).

External computing device 186 may be configured to execute various software applications, algorithms, and/or other suitable programs. External computing device 186 may be implemented as any suitable type of device to facilitate the functionality as described herein. For example, external computing device 186 may be a server 140, as discussed elsewhere herein. As another example, the external computing device 186 may be another computing device associated with an operator or owner of a vehicle 182, such as a desktop or notebook computer. Although illustrated as a single device in FIG. 1B, one or more portions of external computing device 186 may be implemented as one or more storage devices that are physically co-located with external computing device 186, or as one or more storage devices utilizing different storage locations as a shared database structure (e.g. cloud storage).

In some embodiments, external computing device 186 may be configured to perform any suitable portion of the processing functions remotely that have been outsourced by one or more of mobile computing devices 184.1 and/or 184.2 (and/or vehicle controllers 181.1). For example, mobile computing device 184.1 and/or 184.2 may collect customer data (e.g., insurance claim data, vehicle data, vehicle collision data, geographic location data, autonomous vehicles system or feature data, and/or telematics data) as described herein, but may send the data to external computing device 186 for remote processing instead of processing the data locally. In such embodiments, external computing device 186 may receive and process the data to determine whether an anomalous condition exists and, if so, whether to send an alert notification to one or more mobile computing devices 184.1 and 184.2 or take other actions.

In one aspect, external computing device 186 may additionally or alternatively be part of an insurer computing system (or facilitate communications with an insurer computer system), and as such may access insurer databases, execute algorithms, execute applications, access remote servers, communicate with remote processors, etc., as needed to perform insurance-related functions. In aspects in which external computing device 186 facilitates communications with an insurer computing system (or is part of such a system), data received from one or more mobile computing devices 184.1-184.N may include user credentials, which may be verified by external computing device 186 or one or more other external computing devices, servers, etc. These user credentials may be associated with an insurance profile, which may include, for example, financial account information, insurance policy numbers, a description and/or listing of insured assets, vehicle identification numbers of insured vehicles, addresses of insured structures, contact information, premium rates, discounts, etc. In this way, data received from one or more mobile computing devices 184.1-184.N may allow external computing device 186 to uniquely identify each insured customer and/or whether each identified insurance customer has installed the Data Application. In addition, external computing device 186 may facilitate the communication of the updated insurance policies, premiums, rates, discounts, etc., to insurance customers for their review, modification, and/or approval—such as via wireless communication or data transmission to one or more mobile computing devices 184.1-184.N.

In some aspects, external computing device 186 may facilitate indirect communications between one or more of mobile computing devices 184, vehicles 182, smart home controllers, wearable electronic devices, and/or smart infrastructure component 188 via network 130 or another suitable communication network, wireless communication channel, and/or wireless link. Smart infrastructure components 188 may be implemented as any suitable type of traffic infrastructure components configured to receive communications from and/or to send communications to other devices, such as mobile computing devices 184 and/or external computing device 186. Thus, smart infrastructure components 188 may include infrastructure components 126 having infrastructure communication devices 124. For example, smart infrastructure component 188 may be implemented as a smart traffic light, a smart road, a smart railroad crossing signal, a smart construction notification sign, a roadside display configured to display messages, a billboard display, a smart bridge, a smart ramp, a smart sign, a parking garage monitoring device, a smart parking lot equipped for wireless communication or data transmission, etc.

Figure 2:
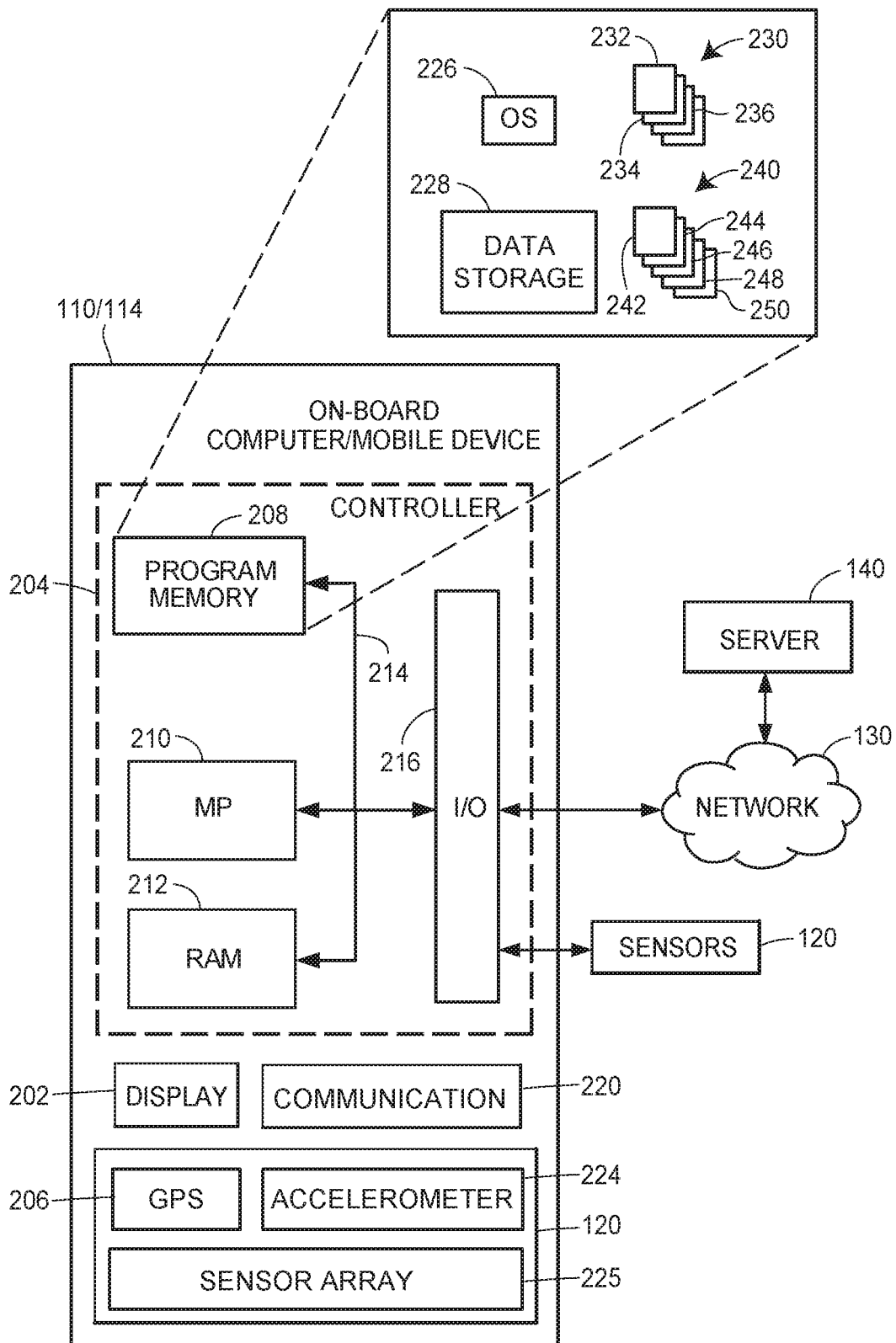
FIG. 2 illustrates a block diagram of an exemplary on-board computer or mobile device.

FIG. 2 illustrates a block diagram of an exemplary mobile device 110 or an exemplary on-board computer 114 (and/or smart home controller) consistent with the system 100 and the system 180. The mobile device 110 or on-board computer 114 (and/or smart home controller) may include a display 202, a GPS unit 206, a communication unit 220, an accelerometer 224, one or more additional sensors (not shown), a user-input device (not shown), and/or, like the server 140, a controller 204. In some embodiments, the mobile device 110 and on-board computer 114 (and/or smart home controller) may be integrated into a single device, or either may perform the functions of both. The on-board computer 114 (or mobile device 110) interfaces with the sensors 120 to receive information regarding the vehicle 108 and its environment, which information is used by the autonomous operation features to operate the vehicle 108.

Similar to the controller 155, the controller 204 may include a program memory 208, one or more microcontrollers or microprocessors (MP) 210, a RAM 212, and an I/O circuit 216, all of which are interconnected via an address/data bus 214. The program memory 208 may include an operating system 226, a data storage 228, a plurality of software applications 230, and/or a plurality of software routines 240. The operating system 226, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for autonomous vehicle operation using the on-board computer 114. The data storage 228 may include data such as user profiles and preferences, application data for the plurality of applications 230, routine data for the plurality of routines 240, and other data related to road navigation and/or the autonomous operation features. In some embodiments, the controller 204 may also include, or otherwise be communicatively connected to, other data storage mechanisms (e.g., one or more hard disk drives, optical storage drives, solid state storage devices, etc.) that reside within the vehicle 108.

As discussed with reference to the controller 155, it should be appreciated that although FIG. 2 depicts only one microprocessor 210, the controller 204 may include multiple microprocessors 210. Similarly, the memory of the controller 204 may include multiple RAMs 212 and multiple program memories 208. Although FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example.

The one or more processors 210 may be adapted and configured to execute any of one or more of the plurality of software applications 230 or any one or more of the plurality of software routines 240 residing in the program memory 204, in addition to other software applications. One of the plurality of applications 230 may be an autonomous vehicle operation application 232 that may be implemented as a series of machine-readable instructions for performing the various tasks associated with implementing one or more of the autonomous operation features according to the autonomous vehicle operation method 300. Another of the plurality of applications 230 may be an autonomous communication application 234 that may be implemented as a series of machine-readable instructions for transmitting and receiving autonomous operation information to or from external sources via the communication module 220. Still another application of the plurality of applications 230 may include an autonomous operation monitoring application 236 that may be implemented as a series of machine-readable instructions for sending information regarding autonomous operation of the vehicle to the server 140 via the network 130.

The plurality of software applications 230 may call various of the plurality of software routines 240 to perform functions relating to autonomous vehicle operation, monitoring, or communication. One of the plurality of software routines 240 may be a configuration routine 242 to receive settings from the vehicle operator to configure the operating parameters of an autonomous operation feature. Another of the plurality of software routines 240 may be a sensor control routine 244 to transmit instructions to a sensor 120 and receive data from the sensor 120. Still another of the plurality of software routines 240 may be an autonomous control routine 246 that performs a type of autonomous control, such as collision avoidance, lane centering, or speed control. In some embodiments, the autonomous vehicle operation application 232 may cause a plurality of autonomous control routines 246 to determine control actions required for autonomous vehicle operation.

Similarly, one of the plurality of software routines 240 may be a monitoring and reporting routine 248 that transmits information regarding autonomous vehicle operation to the server 140 via the network 130. Yet another of the plurality of software routines 240 may be an autonomous communication routine 250 for receiving and transmitting information between the vehicle 108 and external sources to improve the effectiveness of the autonomous operation features. Any of the plurality of software applications 230 may be designed to operate independently of the software applications 230 or in conjunction with the software applications 230.

In addition to connections to the sensors 120 that are external to the mobile device 110 or the on-board computer 114, the mobile device 110 or the on-board computer 114 may include additional sensors 120, such as the GPS unit 206 or the accelerometer 224, which may provide information regarding the vehicle 108 for autonomous operation and other purposes. Such sensors 120 may further include one or more sensors of a sensor array 225, which may include, for example, one or more cameras, accelerometers, gyroscopes, magnetometers, barometers, thermometers, proximity sensors, light sensors, Hall Effect sensors, radar units, etc. The one or more sensors of the sensor array 225 may be positioned to determine telematics data regarding the speed, force, heading, and/or direction associated with movements of the vehicle 108. Furthermore, the communication unit 220 may communicate with other autonomous vehicles, infrastructure, or other external sources of information to transmit and receive information relating to autonomous vehicle operation. The communication unit 220 may communicate with the external sources via the network 130 or via any suitable wireless communication protocol network, such as wireless telephony (e.g., GSM, CDMA, LTE, etc.), Wi-Fi (802.11 standards), WiMAX, Bluetooth, infrared or radio frequency communication, etc.

Furthermore, the communication unit 220 may provide input signals to the controller 204 via the I/O circuit 216. The communication unit 220 may also transmit sensor data, device status information, control signals, or other output from the controller 204 to one or more external sensors within the vehicle 108, mobile devices 110, on-board computers 114, or servers 140.

The mobile device 110 or the on-board computer 114 may include a user-input device (not shown) for receiving instructions or information from the vehicle operator, such as settings relating to an autonomous operation feature. The user-input device (not shown) may include a "soft" keyboard that is displayed on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

The computing devices of FIGS. 1 and 2 may be configured to employ machine or cognitive learning techniques, and/or configured to perform the functionality discussed elsewhere herein, including configured to (1) identify hazardous areas using customer data, such as mobile device (e.g., smart phones, smart glasses, smart watches, smart wearable devices, smart contact lenses, smart cameras, and/or other devices capable of wireless communication), interconnected home, and/or smart vehicle data, the customer data may be associated with, or collected during, vehicle, bicycle, or pedestrian daily or normal travel and/or generated or acquired before, during, or after vehicle collisions or near collisions; (2) identify emerging hazardous areas using real-time customer data; (3) generate and/or update electronic or virtual navigation maps that depict or identify known or emerging hazardous areas; (4) determine a reason or cause why each hazardous areas is hazardous (such as construction area, intersection, poorly timed traffic lights, confusing traffic flow, poorly designed on-ramps or exit ramps, traffic merging issues, inoperable traffic lights or hidden traffic signs, etc.); (5) re-route vehicles, pedestrians, or bicyclists around hazardous areas; (6) generate alerts when approaching hazardous areas; and/or (7) identify alternate and lower risk parking lots in the vicinity, or within a predetermined distance, of a destination.

Machine Learning

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points. In some embodiments, the methods and systems described herein may use machine learning techniques to identify and estimate the effects of observed or latent variables such as customer location, time of day, type of vehicle collision, type of vehicle damage or personal injury, vehicle collision location, amount of vehicle damage or medical expenses associated with a vehicle collision, or other such variables that influence the risks associated with vehicle collisions or vehicle travel.

Some embodiments described herein may include automated machine learning to determine hazardous areas (e.g., roads, road segments, intersections, parking lots, exit ramps, etc.); determine risk levels of the hazardous areas; identify relevant risk factors of the hazardous areas; optimize vehicle, bicycle, or pedestrian routes to avoid hazardous areas; generate or update electronic or virtual navigation maps; generate alerts to vehicles, drivers, bikers, or pedestrians; automatically engage or disengage autonomous features; determine which autonomous features should be preferably engaged or disengaged for each hazardous area or type of hazardous area; determine common causes of vehicle collisions at each hazardous area; generate driving simulations involving the common causes being simulated virtually at each hazardous area location and environment; program smart infrastructure to generate electronic alerts or warnings to vehicles or mobile devices traveling too fast when approaching the hazardous area; and/or perform other functionality as described elsewhere herein.

Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data (such as vehicle collisions being caused by the same thing repeatedly occurring at one or more hazardous areas or location), in order to facilitate making predictions based upon subsequent customer data. Models may be created based upon example inputs of data in order to make valid and reliable predictions for novel inputs.

Additionally or alternatively, the machine learning programs may be trained by inputting sample data sets or certain data into the programs, such as mobile device, vehicle, or smart infrastructure sensor and/or control signal data, and other data discussed herein. The machine learning programs may utilize deep learning algorithms that are primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by computer systems or sensors, and under what conditions those control signals were generated.

The machine learning programs may be trained with vehicle-mounted, home-mounted, and/or mobile device-mounted sensor data to identify certain customer activity, such as routine travel through one or more hazardous areas at certain times of day to determine whether a given type of vehicle collision (e.g., collision causing vehicle damage of a predetermined amount, or causing one or more pedestrian injuries) may be more likely than normal at a specific location, and/or monitoring vehicle behavior as the vehicle travels through the hazardous area, whether under self-control or manual control.

After training, machine learning programs (or information generated by such machine learning programs) may be used to evaluate additional data. Such training data may be related to past and/or historical vehicle collisions or near collisions gathered by smart vehicles, mobile device, or smart infrastructure, or other similar data to be analyzed or processed. The trained machine learning programs (or programs utilizing models, parameters, or other data produced through the training process) may then be used for determining, assessing, analyzing, predicting, estimating, evaluating, or otherwise processing new data not included in the training data. Such new or additional data may be related to current, up-to-date, or real-time vehicle collisions or near collisions gathered by smart vehicles, mobile device, smart infrastructure, or other sensors and cameras, or other similar data to be analyzed or processed. Such trained machine learning programs may, thus, be used to perform part or all of the analytical functions of the methods described elsewhere herein.

Hazardous Area Identification & Re-Routing

Figure 3A:
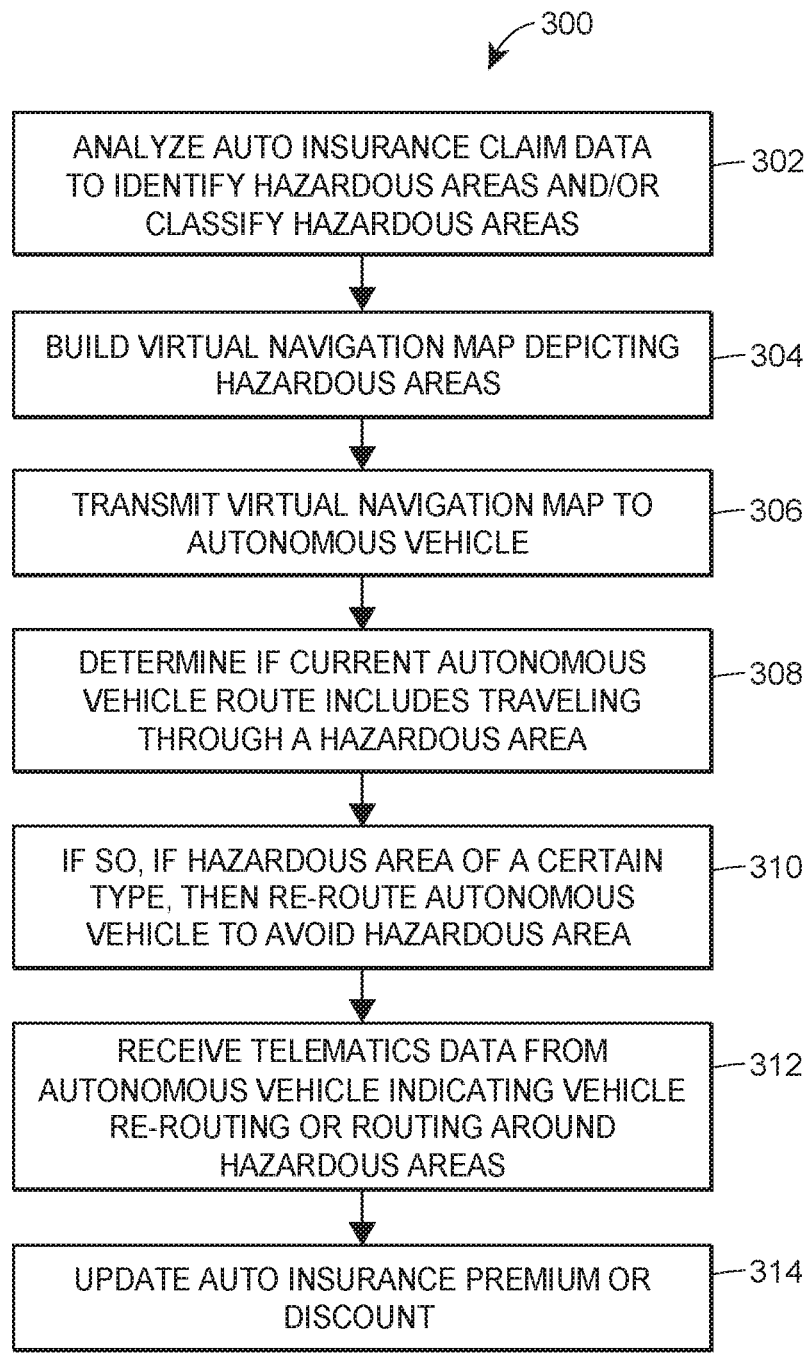
FIGS. 3A & 3B illustrate an exemplary computer-implemented method of using auto insurance claim data, vehicle collision data, and/or other customer data to identify hazardous areas and re-route autonomous vehicles to reduce future vehicle collisions.

FIG. 3A illustrates an exemplary computer-implemented method of using auto insurance claim data and/or other customer data to identify hazardous areas and re-route autonomous vehicles to reduce future vehicle collisions 300. The method 300 may be implemented via one or more processors, transceivers, and/or sensors, and/or via computer-executable instructions stored on non-transitory computer-readable medium or media.

The method 300 may include, via one or more (local or remote) processors, transceivers, and/or sensors, (1) analyzing auto insurance claim data to identify hazardous areas and/or classify the hazardous areas 302. For instance historic or past data from actual auto insurance claims may be analyzed, including images of damaged vehicles. The auto insurance claim data may include a location of a vehicle collision, number of vehicles involved, cause of collision, extent and type of vehicle damage, cost of vehicle repair or replacement, number of injured passengers or pedestrians, etc. The hazardous areas may be classified by type of vehicle damage, cost of vehicle repairs, number of injuries, cost of medical expenses, whether pedestrians or bicyclists were involved, location, type of road (such as intersection, circular traffic pattern, on-ramp, off-ramp, merging traffic from right or left, corner, parking lot, etc.).

The method 300 may include, via the one or more processors, transceivers, and/or sensors, (2) building or generating a virtual navigation (or road) map that depicts or virtually represents the hazardous areas 304. For instance, icons representing or indicating hazardous areas (such as circular icons) may be superimposed upon an existing virtual road map.

The method 300 may include, via the one or more processors, transceivers, and/or sensors, (3) transmitting the virtual navigation map to one or more autonomous vehicles 306. The autonomous vehicles 306 may use the virtual navigation map for routing between origination points and destination points. For instance, virtual routes may generated for routing the vehicle to travel in autonomous mode or under manual operation/control to destination or through a hazardous area.

The method 300 may include, via the one or more processors, transceivers, and/or sensors, (4) determining if the current autonomous vehicle route includes traveling through a hazardous area marked on the virtual map 308. Additionally or alternatively, it may be determined whether the autonomous vehicle is travelling on a road that has a hazardous area along it and/or that is in the direction of current autonomous vehicle, and/or whether the autonomous vehicle is within a predetermined distance of the hazardous area (e.g., within 1, 2, or 5 miles).

If so, the method 300 may include, via the one or more processors, transceivers, and/or sensors, (5) determining a type of the hazardous area, and based upon the type of the hazardous area, then determining whether to re-route the autonomous vehicle to avoid the hazardous area 310. For instance, if the hazardous area is an intersection that is high risk due to a blind spot that negatively impacts manual driving, the autonomous vehicle may be equipped with autonomous features or systems that negate the risk. If so, the autonomous functionality may be automatically engaged prior to entering or traveling the hazardous area, and the autonomous vehicle will not be re-routed. On the other hand, if the autonomous functionality has been found not to negate the specific type of risk (such as via vehicle testing and/or vehicle collision data analysis), then an alternate route may be determined that avoids the hazardous area, and the autonomous vehicle may be re-routed. Additionally or alternatively, if a hazardous area of any specific type, or even of any type, is approaching, (i) an autonomous vehicle may be automatically re-routed, or (ii) an alternate route may be presented and recommended to a human driver, such as via a navigation unit, that avoids the hazardous area.

The method 300 may include, via the one or more processors, transceivers, and/or sensors, (6) receiving telematics data from the autonomous vehicle indicating vehicle re-routing around hazardous areas 312. For instance, the telematics data may indicate how often an autonomous vehicle avoids a hazardous area, travels through a hazardous area, and/or what autonomous systems or features are operating while traversing through hazardous areas.

The method 300 may include, via the one or more processors, transceivers, and/or sensors, (7) updating an auto insurance premium or discount 314. For instance, autonomous vehicles or vehicle owners that display risk averse driving behavior and avoid hazardous areas, or choose an alternative, less risk-prone mode of travel, may be rewarded with lower premiums or higher discounts on auto or other types of insurance. The method 300 may include additional, less, or alternate functionality, including that discussed elsewhere herein.

In one aspect, a computer-implemented method of reducing vehicle collisions may be provided. The method may include (1) analyzing, via one or more processors, auto insurance claim data to identify hazardous areas (the hazardous areas being defined, at least in part, by GPS location or GPS coordinates); (2) building or generating, via the one or more processors, a virtual navigation map of roads with the hazardous areas being visually depicted; (3) transmitting, via the one or more processors and/or transceivers, and via wireless communication or data transmission over one or more radio frequency links or wireless communication channels, the virtual navigation map to a vehicle navigation system of a customer smart or autonomous vehicle to facilitate the vehicle navigation system re-routing the customer vehicle around the hazardous area(s); (4) receiving, via the one or more processors and/or transceivers, and via wireless communication or data transmission over one or more radio frequency links or wireless communication channels, an indication that the customer vehicle re-routed around one or more hazardous areas; (5) generating or adjusting, via the one or more processors, an auto insurance premium or discount based upon the customer vehicle re-routing around the one or more hazardous areas; and/or (6) transmitting, via the one or more processors and/or transceivers, and via wireless communication or data transmission over one or more radio frequency links or wireless communication channels, the adjusted auto insurance premium or discount to a customer mobile device or to the customer vehicle for customer review to incentivize safer vehicle operation.

A hazardous area may be a high risk intersection at an above-average risk of vehicle collision, a high risk portion of a road that is associated with an above-average risk of vehicle collision, or a high risk parking lot associated with an average risk of vehicle collision or theft.

The method may include analyzing, via one or more processors, autonomous vehicle sensor data and/or vehicle camera image data to identify the hazardous areas and/or determine a cause of the vehicle collision. The method may include analyzing, via one or more processors, smart infrastructure sensor data to identify the hazardous areas and/or determine a cause of the vehicle collision. The method may include additional, less, or alternate actions, including those discussed elsewhere herein.

In another aspect, a computer system configured to reduce vehicle collisions may be provided. The computer system may include one or more processors, transceivers, servers, and/or sensors configured to: (1) analyze auto insurance claim data to identify hazardous areas (the hazardous areas being defined, at least in part, by GPS location or GPS coordinates); (2) build or generate a virtual navigation map of roads with the hazardous areas being visually depicted; (3) transmit, via wireless communication or data transmission over one or more radio frequency links or wireless communication channels, the virtual navigation map to a vehicle navigation system of customer smart or autonomous vehicle to facilitate the vehicle navigation system re-routing the customer vehicle around the hazardous areas; (4) receive, via wireless communication or data transmission over one or more radio frequency links or wireless communication channels, an indication that the customer vehicle re-routed around one or more hazardous areas; (5) generate or adjust an auto insurance premium or discount based upon the customer vehicle re-routing around the one or more hazardous areas; and/or (6) transmit, via wireless communication or data transmission over one or more radio frequency links or wireless communication channels, the adjusted auto insurance premium or discount to a customer mobile device or to the customer vehicle for customer review to incentivize safer vehicle operation. The computer system may include additional, less, or alternate functionality, including that discussed elsewhere herein.

In another aspect, a computer-implemented method of reducing vehicle collisions may be provided. The method may include (1) retrieving, via one or more processors, auto insurance claim data and/or vehicle collision data that includes GPS or location data from a memory unit or receiving, via one or more processors and/or transceivers, the auto insurance claim data and/or vehicle collision data that includes GPS or location data transmitted from an agent or customer mobile device or vehicle (via wireless communication or data transmission over one or more radio links and/or wireless communication channels); (2) analyzing, via the one or more processors, the auto insurance claim data and/or vehicle collision data that includes GPS or location data to identify hazardous areas and associated locations thereof (the hazardous areas being defined, at least in part, by GPS location or GPS coordinates); (3) building or generating, via the one or more processors, a virtual navigation road map or navigation map virtual overlay of hazardous areas being visually depicted; (4) transmitting, via the one or more processors and/or transceivers, and via wireless communication or data transmission over one or more radio frequency links or wireless communication channels, the virtual navigation map and/or overlay to a vehicle navigation system of a customer smart or autonomous vehicle to facilitate the vehicle navigation system updating its navigation road map with the overlay and then re-routing the customer vehicle around the hazardous areas; (5) receiving, via the one or more processors and/or transceivers, and via wireless communication or data transmission over one or more radio frequency links or wireless communication channels, an indication that the customer vehicle re-routed around one or more hazardous areas, a virtual log of routes that the vehicle has taken, and/or an indication of hazardous areas that the vehicle has traveled through and/or avoided; (6) generating or adjusting, via the one or more processors, an auto insurance premium or discount based upon the customer vehicle re-routing around the one or more hazardous areas or virtual logs of routes taken; and/or (7) transmitting, via the one or more processors and/or transceivers, and via wireless communication or data transmission over one or more radio frequency links or wireless communication channels, the adjusted auto insurance premium or discount to a customer mobile device or to the customer vehicle for customer review to incentivize safer vehicle operation. The method may include additional, less, or alternate functionality, including that discussed elsewhere herein, and may be implemented via one or more local or remote processors, transceivers, servers, and sensors, and/or non-transitory computer-readable memory units storing computer-executable instructions.

Updating Autonomous Vehicle Navigation Maps

Figure 3B:
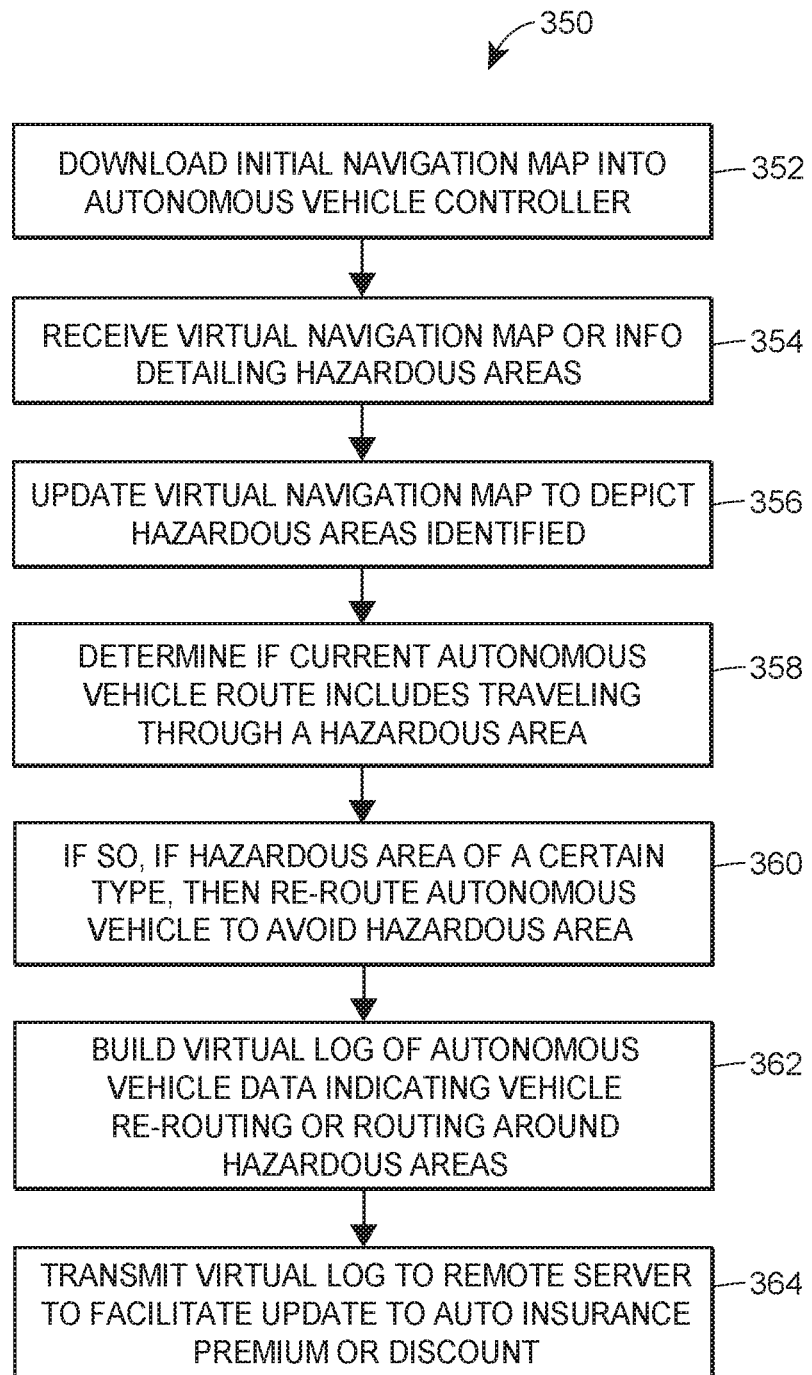

FIG. 3B illustrates an exemplary computer-implemented method of using auto insurance claim data and/or other customer data to identify hazardous areas and re-route autonomous vehicles to reduce future vehicle collisions 350. The method 350 may be implemented via one or more processors, transceivers, servers, and/or sensors, and/or via computer-executable instructions stored on non-transitory computer-readable medium or media.

The method 350 may include, via one or more processors, transceivers, servers, and/or sensors, (1) downloading an initial virtual navigation map into an autonomous vehicle controller or smart vehicle navigation map 352; (2) receiving a virtual navigation map or information detailing hazardous areas identified by analyzing auto insurance claim and/or vehicle collision data (such as discussed elsewhere herein) 354; and/or (3) updating the virtual navigation map to depict the hazardous areas identified 356.

The method 350 may include, via one or more processors, transceivers, servers, and/or sensors, (4) determining if the current autonomous vehicle route includes traveling through a hazardous area marked on the virtual map 358; and (5) if so, determining a type of the hazardous area, and based upon the type of the hazardous area, determining whether to re-route the autonomous vehicle to avoid the hazardous area 360. The method 350 may also include determining whether or not to engage or disengage autonomous features or systems prior to the vehicle reaching the hazardous area, such as discussed elsewhere herein.

The method 350 may include, via one or more processors, transceivers, servers, and/or sensors, (6) building a virtual log of autonomous vehicle data indicating re-routing or routing around hazardous areas 362. The virtual log may include telematics data and/or routes taken by the autonomous vehicle, and how often an autonomous vehicle avoids a hazardous area or travels through a hazardous area, and what autonomous systems or features are operating while traversing through hazardous areas.

The method 350 may include, via one or more processors, transceivers, and/or sensors, (7) transmitting the virtual log to an insurance provider remote server to facilitate the remote server updating an auto insurance premium or discount 364. For instance, autonomous vehicles or other vehicle owners that display risk averse driving behavior and avoid hazardous areas, or choose an alternative, less risk-prone mode of travel, may be rewarded with lower premiums or higher discounts on auto, life, health, personal, or other types of insurance. The method 350 may include additional, less, or alternate functionality, including that discussed elsewhere herein.

In one aspect, a computer-implemented method of reducing vehicle collisions may be provided. The method including (1) downloading, via one or more processors, an initial navigation road map into an autonomous vehicle controller (or navigation system); (2) receiving, via one or more processors and/or transceivers, (i) auto insurance claim data and/or vehicle collision data that includes GPS or location data, and/or (ii) an updated vehicle navigation map that includes hazardous areas depicted, transmitted from an insurance provider remote server or smart infrastructure (via wireless communication or data transmission over one or more radio links and/or wireless communication channels); (3) updating, via the one or more processors, the navigation road map of the autonomous vehicle controller (or navigation system) to reflect hazardous areas indicating by the auto insurance claim data and/or vehicle collision data, and/or updating the navigation map to include hazardous areas and associated locations thereof (the hazardous areas being defined, at least in part, by GPS location or GPS coordinates); (4) using, via the one or more processors, the updated navigation map and/or hazardous area GPS location to identify that the autonomous vehicle is traveling along a current route to a destination that travels through a hazardous area identified by the updated navigation map (and/or auto insurance claim or vehicle collision data); and/or (5) if so, determining, via the one or more processors, an alternate route for the autonomous vehicle to travel to its destination that avoids the hazardous area to facilitate reducing vehicle collisions.

The method may include generating, via the one or more processors, a virtual log of routes that the vehicle has taken, and/or an indication of hazardous areas that the autonomous vehicle has traveled through and/or avoided; and/or transmitting, via the one or more processors, the virtual log to an insurance provider remote server to facilitate the remote server adjusting an auto insurance premium or discount based upon the customer vehicle re-routing around the one or more hazardous areas, or virtual logs of routes taken. The method may include, via the one or more processors and/or transceivers, and via wireless communication or data transmission over one or more radio frequency links or wireless communication channels, receiving and displaying the adjusted auto insurance premium or discount on a customer mobile device or customer vehicle display for customer review to incentivize safer vehicle operation.

The hazardous area may be a high risk intersection at an above-average risk of vehicle collision, a high risk portion of a road that is associated with an above-average risk of vehicle collision, a high risk parking lot that is associated with an above-average risk of theft or vehicle collision, a high risk portion of a road that is associated with a circular traffic pattern, and/or other hazardous areas, including those discussed elsewhere herein. The method may include analyzing, via one or more processors, autonomous vehicle sensor data and/or vehicle camera image data to identify and update the hazardous areas, and/or determine a cause of the vehicle collision. The method may include analyzing, via one or more processors, smart infrastructure sensor data to identify and/or update the hazardous areas, and/or determine a cause of the vehicle collision. The method may include additional, less, or alternate functionality, including that discussed elsewhere herein, and may be implemented via one or more local or remote processors, transceivers, servers, and/or sensors, and/or via non-transitory computer-readable memory units storing computer-executable instructions.

Autonomous Feature Engagement & Disengagement

Figure 4:
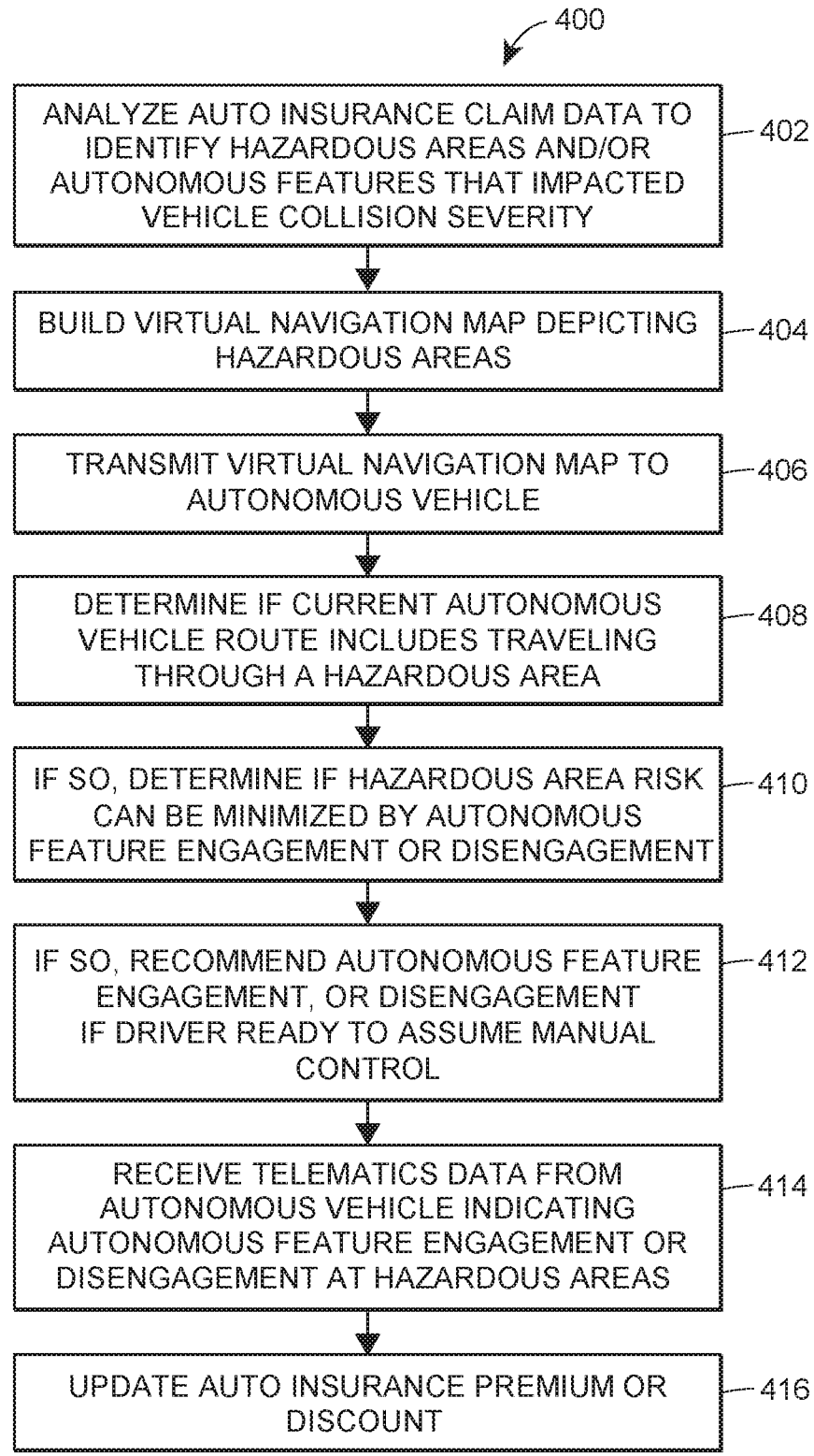
FIG. 4 illustrates an exemplary computer-implemented method of identifying hazardous areas and determining whether to engage or disengage autonomous features prior to an autonomous vehicle passing through the hazardous area.

FIG. 4 illustrates an exemplary computer-implemented method of identifying hazardous areas and determining whether to engage or disengage autonomous features prior to an autonomous vehicle entering or passing through the hazardous area 400. The method 400 may be implemented via one or more processors, transceivers, servers, and/or sensors, and/or via computer-executable instructions stored on non-transitory computer-readable medium or media.

The method 400 may include (1) analyzing auto insurance claim data to identify hazardous areas, and/or autonomous features or systems that impacted vehicle collision severity 402. For instance, vehicle collisions involving autonomous vehicle with certain autonomous features or systems may be analyzed to determine which autonomous features or systems lower risk or lower vehicle damage, or passenger or pedestrian injury, as well those that may not impact risk or the amount/extent of damage or injuries.

The method 400 may include (2) building a virtual navigation map depicting the hazardous areas 404, and transmitting the virtual navigation map to autonomous vehicles and/or vehicle navigation units for vehicle routing 406. The method 400 may include (3) determining if the current autonomous vehicle route includes traveling through a hazardous area 408.

If so, the method 400 may include (4) determining if the hazardous area risk may be minimized by autonomous feature engagement or disengagement 410. For instance, depending upon the type of hazardous area (corner, intersection, highway ramp, merging traffic, abnormal traffic pattern, road construction, etc.) and the type of autonomous feature, (5) the autonomous feature may automatically engage 412 prior to entering a predetermined distance of the hazardous area or a recommendation may be generated alerting the human driver that autonomous feature use is recommended while traversing the hazardous area. Additionally or alternatively, depending upon the type of hazardous area (corner, intersection, highway ramp, merging traffic, abnormal traffic pattern, road construction, etc.) and the type of autonomous feature, it may be recommended to that the human in the driver's seat retake manual control of the vehicle when ready 412 and manual operate the vehicle through the hazardous area if testing has determined that the autonomous feature(s) of the autonomous vehicle increase risk for the type of hazardous area encountered.

The method 400 may include (6) receiving telematics data from the autonomous vehicle indicating autonomous feature engagement or disengagement at or while traversing the hazardous areas 414. The method 400 may include (7) adjusting an auto, health, life, personal, or other type of insurance premium or discount 416 to reflect risk averse vehicle owners that follow recommendations to either engage or disengage autonomous features when approaching and traversing hazardous areas. The method 400 may include additional, less, or alternate functionality, including that discussed elsewhere herein.

In one aspect, a computer-implemented method of reducing vehicle collisions may be provided. The method may include (1) analyzing, via one or more processors, auto insurance claim data to identify hazardous areas (the hazardous areas being defined by GPS location or GPS coordinates); (2) building or generating, via the one or more processors, a virtual navigation map of roads with the hazardous areas being visually depicted; (3) transmitting, via the one or more processors and/or transceivers, and via wireless communication or data transmission over one or more radio frequency links or wireless communication channels, the virtual navigation map to a vehicle navigation or control system of a customer autonomous or semi-autonomous vehicle to facilitate the vehicle navigation or control system automatically engaging a vehicle self-driving feature or system as the autonomous vehicle approaches and drives through one or more hazardous areas; (4) receiving, via the one or more processors and/or transceivers, and via wireless communication or data transmission over one or more radio frequency links or wireless communication channels, an indication that the autonomous vehicle engaged self-driving functionality as the autonomous vehicle traveled through the one or more hazardous areas; (5) generating or adjusting, via the one or more processors, an auto insurance premium or discount based upon the autonomous vehicle self-driving through the one or more hazardous areas; and/or (6) transmitting, via the one or more processors and/or transceivers, and via wireless communication or data transmission over one or more radio frequency links or wireless communication channels, the adjusted auto insurance premium or discount to a customer mobile device or to the customer vehicle for customer review to incentivize autonomous vehicle self-driving through hazardous areas.

In another aspect, a computer-implemented method of reducing vehicle collisions may be provided. The method may include (1) analyzing, via one or more processors, auto insurance claim data to identify hazardous areas (the hazardous areas being defined by GPS location or GPS coordinates); (2) building or generating, via the one or more processors, a virtual navigation map of roads with the hazardous areas being visually depicted; (3) transmitting, via the one or more processors and/or transceivers, and via wireless communication or data transmission over one or more radio frequency links or wireless communication channels, the virtual navigation map to a vehicle navigation or control system of a customer autonomous or semi-autonomous vehicle to facilitate the vehicle navigation or control system automatically dis-engaging a vehicle self-driving feature or system as the autonomous vehicle approaches and drives through one or more hazardous areas or recommending manual vehicle operation while traveling through the one or more hazardous areas; (4) receiving, via the one or more processors and/or transceivers, and via wireless communication or data transmission over one or more radio frequency links or wireless communication channels, an indication that the autonomous vehicle dis-engaged self-driving functionality and/or was driven under manual control or direction as the autonomous vehicle traveled through the one or more hazardous areas; (5) generating or adjusting, via the one or more processors, an auto insurance premium or discount based upon the autonomous vehicle being manually driven through the one or more hazardous areas; and/or (6) transmitting, via the one or more processors and/or transceivers, and via wireless communication or data transmission over one or more radio frequency links or wireless communication channels, the adjusted auto insurance premium or discount to a customer mobile device or to the customer vehicle for customer review to incentivize lower risk vehicle operation of autonomous vehicles traveling through hazardous areas.

In another aspect, a computer-implemented method of reducing vehicle collisions may be provided. The method may include (1) analyzing, via one or more processors, auto insurance claim data and/or vehicle collision data to identify hazardous areas, the hazardous areas being associated with vehicle collisions involving vehicle damage above a predetermined amount (or vehicle damage or needed repairs above a predetermined threshold), each hazardous area being defined, at least in part, by GPS location or GPS coordinates; (2) building or generating, via the one or more processors, a virtual navigation map of roads with the hazardous areas being visually depicted; (3) and/or transmitting, via the one or more processors and/or transceivers, and via wireless communication or data transmission over one or more radio frequency links or wireless communication channels, the virtual navigation map to a vehicle navigation or control system of a customer autonomous or semi-autonomous vehicle to facilitate the vehicle navigation or control system automatically engaging (or disengaging with manual operator permission and awareness) a vehicle self-driving feature or system as the autonomous vehicle approaches and drives through one or more hazardous areas.

The method may include (4) receiving, via the one or more processors and/or transceivers, and via wireless communication or data transmission over one or more radio frequency links or wireless communication channels, an indication that the autonomous vehicle engaged self-driving functionality as the autonomous vehicle traveled through the one or more hazardous areas (or virtual log of such information); and/or (5) generating or adjusting, via the one or more processors, an auto insurance premium or discount based upon the autonomous vehicle self-driving through the one or more hazardous areas. The method may include (6) transmitting, via the one or more processors and/or transceivers, and via wireless communication or data transmission over one or more radio frequency links or wireless communication channels, the adjusted auto insurance premium or discount to a customer mobile device or to the customer vehicle for customer review to incentivize autonomous vehicles self-driving through hazardous areas.

Analyzing, via one or more processors, the auto insurance claim data may involve analyzing past or historic auto insurance claim data to identify hazardous areas, such as intersections, road segments, circular or abnormal traffic patterns, highway exit ramps or on-ramps, or parking lots with an abnormal or above average risk of vehicle collision. Analyzing, via one or more processors, the auto insurance claim data may involve analyzing past or historic auto insurance claim data to identify hazardous areas associated with auto insurance claims above a predetermined threshold or amount, or total loss vehicles. Analyzing, via one or more processors, the auto insurance claim data may involve analyzing past or historic auto insurance claim data to identify hazardous areas associated with vehicle collisions resulting in vehicle damage requiring auto repairs above a predetermined threshold or amount (such as $500, or $2,000).

Analyzing, via one or more processors, the vehicle collision data may involve analyzing current or up-to-date auto insurance claim data, telematics data, vehicle sensor data, and/or autonomous vehicle data to identify hazardous areas, such as intersections, road segments, circular or abnormal traffic patterns, highway exit or on ramps, or parking lots with an abnormal or above average risk of vehicle collision. Analyzing, via one or more processors, the auto insurance claim data may involve analyzing current or up-to-date auto insurance claim data, telematics data, vehicle sensor data, and/or autonomous vehicle data to identify hazardous areas associated with auto insurance claims above a predetermined threshold or amount. Analyzing, via one or more processors, the auto insurance claim data may involve analyzing current or up-to-date auto insurance claim data, telematics data, vehicle sensor data, and/or autonomous vehicle data to identify hazardous areas associated with vehicle collisions resulting in vehicle damage requiring auto repairs above a predetermined threshold or amount (such as $500, or $2,000).

The method may further include analyzing the auto insurance claim data and/or vehicle collision data to identify autonomous feature performance of autonomous vehicles involved with the hazardous areas, and determining whether or not each type of autonomous feature should be engaged or disengaged prior to an autonomous vehicle having that type of autonomous feature entering or approaching a hazardous area (based upon each autonomous feature performance at each hazardous area, such as determined from past auto insurance claim or past vehicle collision data). The foregoing methods may include additional, less, or alternate actions, including those discussed elsewhere herein, and may be implemented via computer systems comprising processors, transceivers, servers, and/or sensors.

In another aspect, a computer system configured to reduce vehicle collisions may be provided. The computer system may include one or more processors, transceivers, servers, and/or sensors configured to: (1) retrieve auto insurance claim data and/or vehicle collision data from one or more memory units, or receive the auto insurance claim data and/or vehicle collision data via wireless communication or data transmission over one or more radio links or wireless communication channels; (2) analyze the auto insurance claim data and/or vehicle collision data to identify hazardous areas, the hazardous areas being associated with vehicle collisions involving vehicle damage above a predetermined amount (or vehicle damage or needed repairs above a predetermined threshold or dollar amount), each hazardous areas being defined by GPS location or GPS coordinates; (3) build or generate a virtual navigation map of roads with the hazardous areas being visually depicted; and/or (4) transmit, via wireless communication or data transmission over one or more radio frequency links or wireless communication channels, the virtual navigation map to a vehicle navigation unit or control system of a customer autonomous or semi-autonomous vehicle to facilitate the vehicle navigation unit or control system automatically engaging (or with customer permission and awareness, disengaging) a vehicle self-driving feature or system as the autonomous vehicle approaches and drives through one or more hazardous areas. The computer system may include additional, less, or alternate functionality, including that discussed elsewhere herein.

Building Hazardous Area Virtual Maps & Alert Generation

Figure 5:
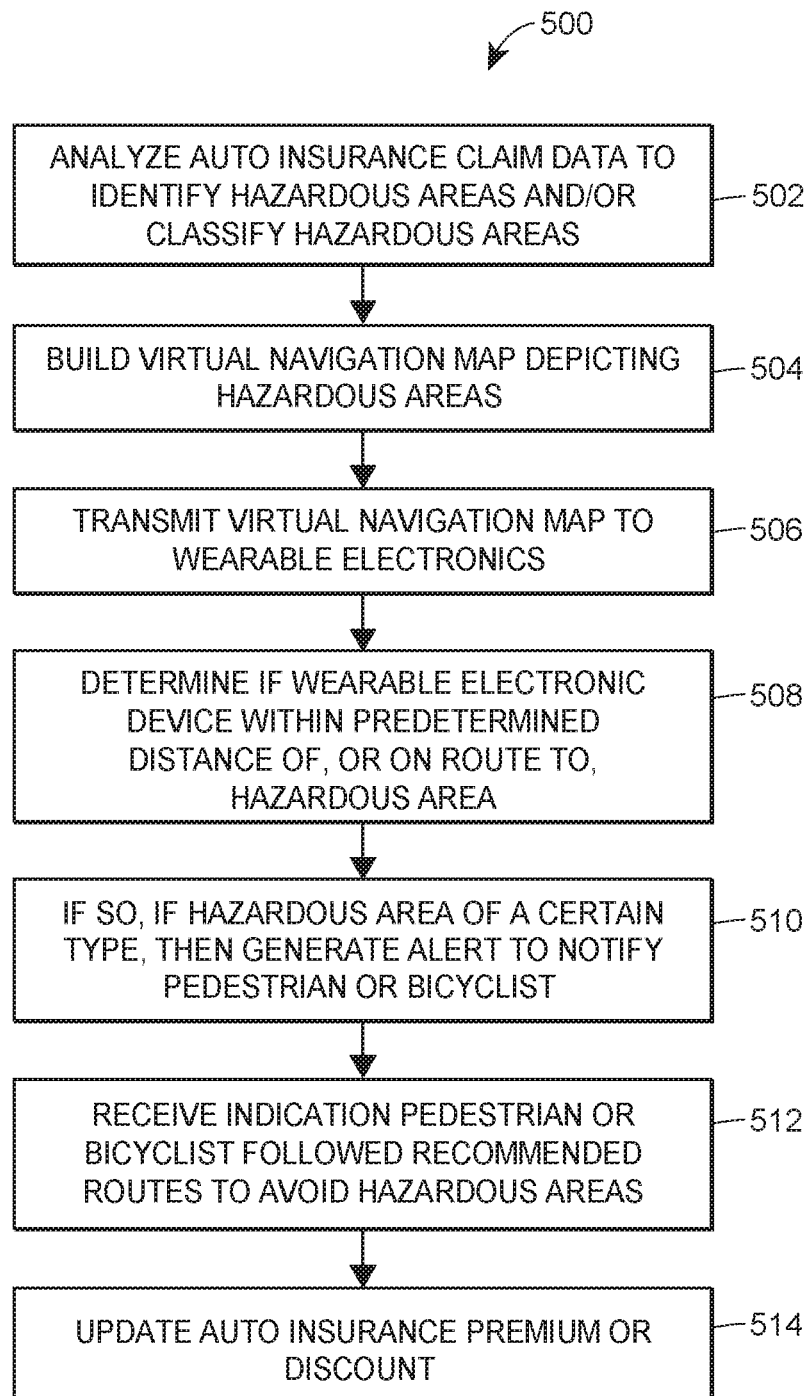
FIG. 5 illustrates an exemplary computer-implemented method of building hazardous area virtual maps and generating alerts for bicyclist or pedestrian wearable electronics.

FIG. 5 illustrates an exemplary computer-implemented method of building hazardous area virtual maps and generating alerts for bicyclist or pedestrian wearable electronics 500. The method 500 may be implemented via one or more local or remote processors, transceivers, servers, and/or sensors, and/or via computer-executable instructions stored on non-transitory computer-readable medium or media.

The method 500 may include (1) analyzing auto insurance claim data to identify hazardous areas and/or classify hazardous areas 502. For instance historic or past data from actual auto insurance claims may be analyzed, including images of damaged vehicles. The auto insurance claim data may include a location of a vehicle collision, number of vehicles involved, cause of collision, extent and type of vehicle damage, cost of vehicle repair or replacement, number of injured passengers or pedestrians, type of injuries, etc. The hazardous areas may be classified by type of vehicle damage, cost of vehicle repairs, number and type of injuries, whether pedestrians or bicyclists were involved, location, and/or type of road (such as intersection, circular traffic pattern, on-ramp, off-ramp, merging traffic from right or left, corner, etc.).

The method 500 may include (2) building or generating a virtual navigation (or road) map that depicts or virtually represents the hazardous areas 504. For instance, icons representing or indicating hazardous areas (such as circular icons) may be superimposed upon an existing virtual road map.

The method 500 may include (3) transmitting the virtual navigation map to wearable electronics associated with users (such as smart watches or glasses), or user mobile devices. The method 500 may include (4) determining if a current (GPS) location of the wearable electronics device is within a predetermined distance of, or on route to, a hazardous area 508. For instance, it may be determined that a wearable device on a biker or pedestrian is approaching a high risk intersection or corner. If so, the method 500 may include (5) determining whether the hazardous area is of a certain type (such as an intersection, one way street, abnormal traffic pattern or merging traffic, etc.), and/or generate an electronic alert to notify the pedestrian or bicyclist of the approaching hazardous area 510. Also, recommendations may be generated and presented via the wearable devices to allow the user time to avoid the hazardous areas, and/or alternate routes may be generated and presented via the wearable devices.

The method 500 may include (6) receiving an indication that the pedestrian or bicyclist followed a recommendation or alternate route to avoid one or more hazardous areas 512. The method 500 may include (7) updating an auto, life, health, personal, or other type of insurance premium or discount to reflect risk averse behavior by the user or insured 514. The method 500 may include additional, less, or alternate functionality, including that discussed elsewhere herein.

In one aspect, a computer-implemented method of reducing vehicle collisions may be provided. The method may include (1) retrieving, via one or more processors, auto insurance claim data and/or vehicle collision data that includes GPS or location data from a memory unit or receiving, via one or more processors and/or transceivers, the auto insurance claim data and/or vehicle collision data that includes GPS or location data transmitted from an agent or customer mobile device or vehicle (via wireless communication or data transmission over one or more radio links and/or wireless communication channels); (2) analyzing, via the one or more processors, the auto insurance claim data and/or vehicle collision data that includes GPS or location data to identify hazardous areas and associated locations thereof (the hazardous areas being defined by, at least in part, GPS location or GPS coordinates), the hazardous areas being associated with vehicle collisions that involve one or more pedestrians, and/or one or more bicyclists; (3) building or generating, via the one or more processors, a virtual navigation road map or navigation map virtual overlay of hazardous areas being visually depicted; (4) transmitting, via the one or more processors and/or transceivers, and via wireless communication or data transmission over one or more radio frequency links or wireless communication channels, the virtual navigation map and/or overlay to a customer mobile device and/or wearable electronics device to facilitate a navigation application (App) stored thereon to update itself with the overlay and then re-route customers around the hazardous areas; (5) receiving, via the one or more processors and/or transceivers, and via wireless communication or data transmission over one or more radio frequency links or wireless communication channels sent from the customer device and/or wearable electronics device, an indication that the customer re-routed around or avoided one or more hazardous areas, a virtual log of routes that the customer has walked, jogged, or biked, and/or an indication of hazardous areas that the customer has traveled on foot (or biked through) and/or avoided; (6) generating or adjusting, via the one or more processors, a personal, health, life or other insurance premium or discount based upon (i) the customer re-routing around the one or more hazardous areas, and/or (ii) the virtual logs of pedestrian or bike routes taken; and/or (7) transmitting, via the one or more processors and/or transceivers, and via wireless communication or data transmission over one or more radio frequency links or wireless communication channels, the adjusted insurance premium or discount to the customer mobile device or wearable electronics device for customer review to incentivize safer pedestrian or bicyclist travel. The foregoing method may include additional, less, or alternate actions, including those discussed elsewhere herein, and may be implemented via computer systems comprising processors, transceivers, servers, and/or sensors.

High Risk Parking Lot Identification & Avoidance

Figure 6:
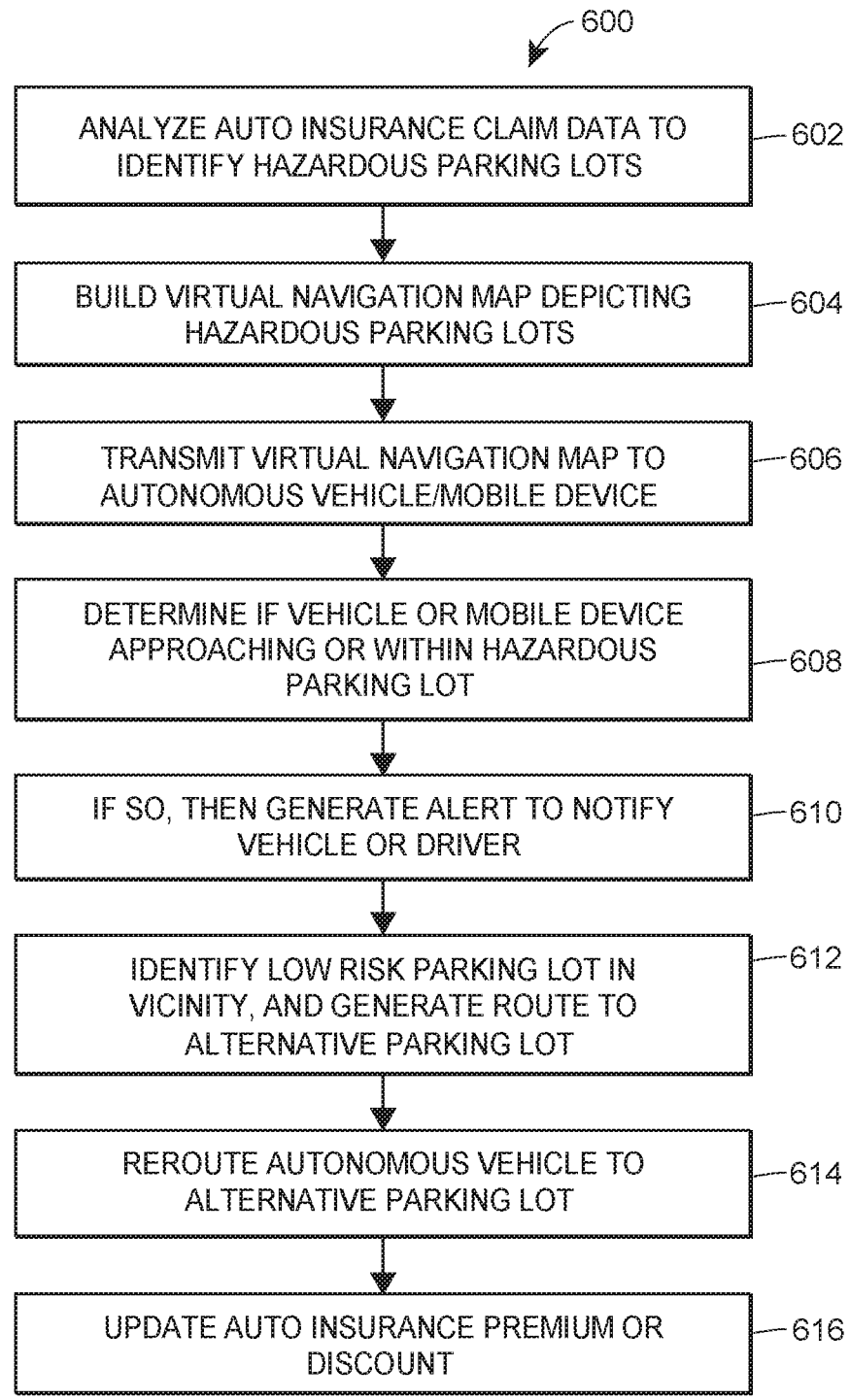
FIG. 6 illustrates an exemplary computer-implemented method of identifying high risk parking lots and routing vehicles to alternate parking lots associated with lower risk of collision or theft.

FIG. 6 illustrates an exemplary computer-implemented method of identifying high risk parking lots and routing vehicles to alternate parking lots associated with lower risk of collision or theft 600. The method 600 may be implemented via one or more processors, transceivers, servers, and/or sensors, and/or via computer-executable instructions stored on non-transitory computer-readable medium or media.

The method 600 may include (1) analyzing auto insurance claim data to identify hazardous parking lots and/or classify the hazard 602. For instance historic or past data from actual auto insurance claims may be analyzed, including images of damaged vehicles. The auto insurance claim data may include a location of a vehicle collision that includes a parking lot. The hazards may be classified by vehicle collision, cause of collision, extent and type of vehicle damage, cost of vehicle repair or replacement, number of injured passengers, bicyclists, or pedestrians, type and extent of injuries, and/or vehicle theft.

The method 600 may include (2) building or generating a virtual navigation (or road) map that depicts or virtually represents the hazardous parking lots 604. For instance, icons representing or indicating hazardous parking lots (such as circular icons) may be superimposed upon an existing virtual navigation or road map.

The method 600 may include (3) transmitting the virtual navigation map to autonomous vehicles, smart vehicles, vehicle navigation units, and/or mobile devices. The method 600 may include (4) determining if a current (GPS) location of the vehicle or mobile device (traveling within the vehicle) is within a predetermined distance of, or on route to, a hazardous parking lot 608. If so, the method 600 may include (5) generating an alert to notify the autonomous or smart vehicle or vehicle operator 610. For instance, an alert may indicate that the parking lot is associated with a higher than normal risk of vehicle collision for vehicles entering or exiting the lot, and/or a higher than normal risk of vehicle theft.

The method 600 may include identifying a lower risk parking lot in the vicinity (such as within a few blocks or so) or along the route to the ultimate destination (e.g., shopping mall, restaurant, park, ball park, hotel, etc.), and/or generating a route to the alternate or lower risk parking lot 612 for the autonomous vehicle or vehicle operator to follow. The method 600 may include re-routing the autonomous vehicle to the alternate parking lot 614. The method 600 may include updating an auto or other insurance premium or discount 616 based upon the insured following the recommendations provided associated with lower risk parking lots, and/or otherwise exhibiting risk averse behavior. The method 600 may include additional, less, or alternate functionality, including that discussed elsewhere herein.

In one aspect, a computer-implemented method of reducing vehicle collisions may be provided. The method may include (1) analyzing, via one or more processors, auto insurance claim data to identify hazardous areas (the hazardous areas being defined by, at least in part, GPS location or GPS coordinates); (2) building or generating, via the one or more processors, a virtual navigation map of roads with the hazardous areas being visually depicted; (3) identifying, via the one or more processors, public parking lots within the virtual navigation map, and determining whether each public parking lot is associated with a hazardous area or not; (4) determining, via the one or more processors, when a vehicle is approaching or parking in a public parking lot associated with a hazardous area, and if so, then selecting, via the one or more processors, a nearby public parking lot that is not associated with a hazardous area; (5) generating, via the one or more processors, a route from a current position to the nearby public parking lot that is not associated with a hazardous area; and/or (6) routing, via the one or more processors and/or transceivers, the vehicle to the nearby public parking lot using the route generated to facilitate reducing parking lot vehicle collisions and/or vehicle theft from parking lots. The method may include additional, less, or alternate actions, including those discussed elsewhere herein.

In another aspect, a computer system configured to reduce vehicle collisions may be provided. The computer system may include one or more processors, transceivers, and/or sensors configured to: (1) analyze auto insurance claim data to identify hazardous areas (the hazardous areas being defined by, at least in part, GPS location or GPS coordinates); (2) build or generate a virtual navigation map of roads with the hazardous areas being visually depicted; (3) identify public parking lots within the virtual navigation map, and determine whether each public parking lot is associated with a hazardous area or not; (4) determine when a vehicle is approaching or parking in a public parking lot associated with a hazardous area, and if so, then selecting, via the one or more processors, a nearby public parking lot (such as within a predetermined distance, for instance, 1 or 2 miles) that is not associated with a hazardous area; (5) generate a route from a current position to the nearby public parking lot that is not associated with a hazardous area; and/or (6) route or re-route the vehicle to the nearby public parking lot not associated with a hazardous area using the route generated to facilitate reducing parking lot vehicle collisions and/or vehicle theft from parking lots. The computer system may include additional, less, or alternate functionality, including that discussed elsewhere herein.

In another aspect, a computer-implemented method of reducing vehicle collisions may be provided. The method may include (1) analyzing, via one or more processors, auto insurance claim data to identify hazardous areas (the hazardous areas being defined by GPS location or GPS coordinates); (2) building or generating, via the one or more processors, a virtual navigation map of roads with the hazardous areas being visually depicted; (3) identifying, via the one or more processors, public parking lots within the virtual navigation map, and determine whether each public parking lot is associated with a hazardous area or not; and/or (4) determining, via the one or more processors, when a vehicle is approaching or parking in a public parking lot associated with a hazardous area, and if so, then generating a haptic, visual, or audio alert to alert the driver to facilitate reduced vehicle collisions and theft.

The method may also include determining, via the one or more processors, when a vehicle is approaching or parking in a public parking lot associated with a hazardous area, and if so, then selecting, via the one or more processors, a nearby public parking lot that is not associated with a hazardous area; generating, via the one or more processors, a route from a current position to the nearby public parking lot that is not associated with a hazardous area; and/or routing, via the one or more processors and/or transceivers, the vehicle to the nearby public parking lot using the route generated to facilitate reducing parking lot vehicle collisions and/or vehicle theft from parking lots. The method may include additional, less, or alternate actions, including those discussed elsewhere herein.

ADDITIONAL CONSIDERATIONS

In one aspect, a customer may opt-in to a customer program. The customer may give their affirmative consent or permission to have certain types of data collected and analyzed, such as mobile device, smart vehicle, telematics data, sensor data, smart home data, auto insurance claim data, and/or vehicle collision data. In return, a remote server may generate alerts associated with hazardous areas from analysis of the customer data. The remote server may also update virtual navigation maps with hazardous areas being depicted. The remote server may generate insurance discounts to reward risk averse behavior. The remote server may perform other functionality as well, including that discussed elsewhere herein.

All of the foregoing methods discussed herein may be include additional, less, or alternate actions, including those discussed elsewhere herein. All of the foregoing methods may be implemented via one or more local or remote processors, transceivers, servers, and/or sensors, and/or via computer-executable instructions stored on computer-readable medium or media. The foregoing computer systems may also include additional, less, or alternate functionality, including that discussed elsewhere herein.

Although this detailed description contemplates various embodiments, it should be understood that the legal scope of any claimed system or method is defined by the words of the claims set forth at the end of this patent. This detailed description is to be construed as exemplary only and does not describe every possible embodiment, as describing every possible embodiment would be impractical, if not impossible.

It is therefore intended that the foregoing detailed description be regarded as illustrative rather than limiting, and that it be understood that it is the following claims, including all equivalents, that are intended to define the spirit and scope of this invention.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This description, and the claims that follow, should be read to include one or at least one. The singular also includes the plural unless it is obvious that it is meant otherwise.

In various embodiments, hardware systems described herein may be implemented mechanically or electronically. For example, a hardware system may comprise dedicated circuitry or logic that is permanently configured (e.g., as a special-purpose processor, such as a field programmable gate array (FPGA) or an application-specific integrated circuit (ASIC) to perform certain operations). A hardware system may also comprise programmable logic or circuitry (e.g., as encompassed within a general-purpose processor or other programmable processor) that is temporarily configured by software to perform certain operations. It will be appreciated that the decision to implement a hardware system mechanically, in dedicated and permanently configured circuitry, or in temporarily configured circuitry (e.g., configured by software) may be driven by cost and time considerations.

References to a "memory" or "memory device" refer to a device including computer-readable media ("CRM"). "CRM" refers to a medium or media accessible by the relevant computing system for placing, keeping, and/or retrieving information (e.g., data, computer-readable instructions, program modules, applications, routines, etc.). Note, "CRM" refers to media that is non-transitory in nature, and does not refer to disembodied transitory signals, such as radio waves. The CRM of any of the disclosed memory devices may include volatile and/or nonvolatile media, and removable and/or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which may be used to store information and which may be accessed by the computing system. One or more of the disclosed memory devices may be coupled a processor via a memory interface. A memory interface is circuitry that manages the flow of data between the memory device and the bus of the computer system to which it is coupled.

References to a "communication interface" or "network interface" generally refer to one or more interfaces for a system that enable the system to send information/data to other system, and/or to receive information/data from other systems or devices. These other systems or devices may include input devices (e.g., keyboard, mouse, etc.), output devices (e.g., a display device, speakers, etc.), networking equipment (e.g., routers, modems, etc.), and other computing devices (e.g., servers, mobile devices, etc.). In some instances, the communication interface of a system may be utilized to establish a direct connection to another system. In some instances, a communication interface of a system enables the system to connect to a network (via a link). Depending on the embodiment, the communication interface may include circuitry for permitting wireless communication (e.g., short-range and/or long-range communication) or wired communication with one or more devices or systems using any suitable communications protocol. For example, the communication interface 204 shown in FIG. 2 may support Wi-Fi (e.g., an 802.11 protocol), Ethernet, Bluetooth, high frequency systems (e.g., 900 MHZ, 2.4 GHZ, and 5.6 GHZ communication systems), infrared, transmission control protocol/internet protocol ("TCP/1P") (e.g., any of the protocols used in each of the TCP/IP layers), hypertext transfer protocol ("HTTP"), BitTorrent, file transfer protocol ("FTP"), real-time transport protocol ("RTP"), real-time streaming protocol ("RTSP"), secure shell protocol ("SSH"), any other communications protocol, or any combination thereof. The communication interface 204 may include circuitry that enables the system to be electrically or optically coupled to another device (e.g., via a coax cable or fiber optic cable) and to communicate with that other device.

A "communication link" or "link" is a pathway or medium connecting two or more nodes. A link may be a physical link and/or a logical link. A physical link is the interface and/or medium(s) over which information is transferred, and may be wired or wireless in nature. Examples of physicals links may include a cable with a conductor for transmission of electrical energy, a fiber optic connection for transmission of light, and/or a wireless electromagnetic signal that carries information via changes made to one or more properties of an electromagnetic wave(s).

A logical link between two or more nodes represents an abstraction of the underlying physical links and/or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

The performance of certain of the operations may be distributed among one or more processors, not only residing within a single machine, but deployed across a number of machines. In some example embodiments, the described processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Finally, unless a claim element is defined by reciting the word "means" and a function without the recital of any structure, it is not intended that the scope of any claim element be interpreted based upon the application of 35 U.S.C. § 112(f).

The invention claimed is:

1. A computer-implemented method, the method comprising:
   in response to determining that a vehicle is approaching or parking in a public parking lot associated with a hazardous area, automatically selecting, via the one or more processors, a nearby public parking lot that is along, or within a predetermined vicinity of, a preexisting navigation route, wherein the nearby public parking lot is not associated with a hazardous area;
   generating, via the one or more processors, a route from a current position of the vehicle to the nearby public parking lot that is not associated with a hazardous area; and
   routing, via one or more transceivers and/or the one or more processors, the vehicle to the nearby public parking lot using the generated route.

2. The computer-implemented method of claim 1, further comprising generating, via the one or more processors, an audio alert and/or an haptic alert when the vehicle is approaching or parking in the public parking lot associated with a hazardous area.

3. The computer-implemented method of claim 1, further comprising generating, via the one or more processors, a visual alert when the vehicle is approaching or parking in the public parking lot associated with a hazardous area.

4. The computer-implemented method of claim 1, wherein the hazardous area is an area associated with a higher risk of vehicle collision and/or theft compared to a normal level of risk.

5. The computer-implemented method of claim 4, wherein the nearby public parking lot that is not associated with a hazardous area is a public parking lot associated with a lower risk of vehicle collision.

6. The computer-implemented method of claim 4, wherein the nearby public parking lot that is not associated with a hazardous area is a public parking lot associated with a lower risk of theft.

7. The computer-implemented method of claim 1, wherein the nearby public parking lot is within a predetermined distance of the public parking lot associated with a hazardous area.

8. The computer-implemented method of claim 1, further comprising
   determining, via the one or more processors, one or more risk averse behaviors performed by an operator of the vehicle during operation of the vehicle, and
   updating, via the one or more processors, an insurance premium or discount based upon the one or more risk averse behaviors.

9. The computer-implemented method of claim 8, wherein the one or more risk averse behaviors include a following of the generated route to the nearby public parking lot that is not associated with a hazardous area.

10. The computer-implemented method of claim 1, further comprising:
    analyzing, via one or more processors, auto insurance claim data to identify hazardous areas, the hazardous areas being defined, at least in part, by GPS location or GPS coordinates; and
    building or generating, via the one or more processors, a virtual navigation map of roads within the hazardous areas.

11. A computer system comprising:
    one or more processors; and
    one or more memories storing computer-executable instructions that, when executed, cause the processor to:
        in response to determining that the vehicle is approaching or parking in the public parking lot associated with a hazardous area, select a nearby public parking lot that is along, or within a predetermined vicinity of, a preexisting navigation route, wherein the nearby public parking lot is not associated with a hazardous area;
        generate a route from a current position of the vehicle to the nearby public parking lot that is not associated with a hazardous area; and
        route or reroute the vehicle to the nearby public parking lot using the generated route.

12. The computer system of claim 11, wherein the processor routes or reroutes the vehicle further using one or more transceivers.

13. The computer system of claim 11, wherein the computer-executable instructions, when executed on the processor, further cause the processor to generate an audio alert and/or a haptic alert when the vehicle is approaching or parking in the public parking lot associated with a hazardous area.

14. The computer system of claim 11, wherein the computer-executable instructions, when executed on the processor, further cause the processor to generate visual alert when the vehicle is approaching or parking in the public parking lot associated with a hazardous area.

15. The computer system of claim 11, wherein the hazardous area is an area associated with a higher risk of vehicle collision and/or theft compared to a normal level of risk.

16. The computer system of claim 15, wherein the nearby public parking lot that is not associated with a hazardous area is a public parking lot associated with a lower risk of vehicle collision.

17. The computer system of claim 15, wherein the nearby public parking lot that is not associated with a hazardous area is a public parking lot associated with a lower risk of theft.

18. The computer system of claim 11, wherein the nearby public parking lot is within a predetermined distance of the public parking lot associated with a hazardous area.

19. The computer system of claim 11, wherein the computer-executable instructions, when executed on the processor, further cause the processor to:
- determine one or more risk averse behaviors performed by an operator of the vehicle during operation of the vehicle, and
- update an insurance premium or discount based upon the one or more risk averse behaviors.

20. The computer system of claim 19, wherein the one or more risk averse behaviors include a following of the generated route to the nearby public parking lot that is not associated with a hazardous area.

\* \* \* \* \*